US012731912B2

(12) United States Patent
Ng et al.

(10) Patent No.: US 12,731,912 B2
(45) Date of Patent: Sep. 8, 2026

(54) ANTENNA ASSEMBLY

(71) Applicant: TE Connectivity Solutions GmbH, Schaffhausen (CH)

(72) Inventors: KokJiunn Ng, Prai (MY); Keanmeng Lim, Prai (MY); Yensiang Tan, Prai (MY)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 225 days.

(21) Appl. No.: 18/596,807

(22) Filed: Mar. 6, 2024

(65) Prior Publication Data

US 2024/0305017 A1 Sep. 12, 2024

(51) Int. Cl.

| | |
|---|---|
| ***H01Q 21/28*** | (2006.01) |
| ***H01Q 1/32*** | (2006.01) |
| ***H01Q 1/42*** | (2006.01) |
| ***H01Q 9/42*** | (2006.01) |

(52) U.S. Cl.
CPC ........... *H01Q 21/28* (2013.01); *H01Q 1/3275* (2013.01); *H01Q 1/42* (2013.01); *H01Q 9/42* (2013.01)

(58) Field of Classification Search
CPC ........ H01Q 21/28; H01Q 1/3275; H01Q 1/42; H01Q 9/42
See application file for complete search history.

(56) References Cited

U.S. PATENT DOCUMENTS

2018/0159208 A1* 6/2018 Ameri .................... H01Q 21/28

* cited by examiner

*Primary Examiner* — Graham P Smith

(57) ABSTRACT

An antenna assembly includes an antenna base, a first cellular antenna mounted to the antenna base along the central longitudinal axis, a second cellular antenna mounted to the antenna base along the central longitudinal axis, a satellite antenna mounted to the antenna base along the central longitudinal axis, a first Wi-Fi antenna mounted to the antenna base offset from the central longitudinal axis toward the first side, and a second Wi-Fi antenna mounted to the antenna base offset from the central longitudinal axis toward the second side.

23 Claims, 26 Drawing Sheets

ANTENNA ASSEMBLY

CROSS REFERENCE TO RELATED APPLICATIONS

This application claims the benefit of Malaysia Application No. PI 2023001197 filed 6 Mar. 2023, the subject matter of which is herein incorporated by reference in its entirety.

BACKGROUND OF THE INVENTION

The subject matter herein relates generally to antenna assemblies.

Various different types of antennas are used in the automotive industry, including AM/FM radio antennas, satellite digital audio radio service antenna, global positioning system antennas, cell phone antennas, and the like. The antenna assembly is operable for transmitting and/or receiving signals to/from the vehicle. Some known antennas are multiband antennas having multiple antennas to cover and operate at multiple frequency ranges. Automotive antennas may be installed or mounted on a vehicle surface, such as the roof, trunk, or hood of the vehicle to help ensure that the antennas have unobstructed views overhead or toward the zenith. The antenna may be connected via a coaxial cable to one or more electronic devices, such as a radio receiver, a touchscreen display, a navigation device, a cellular phone, an autonomous driving system, and the like. However, it is desirable that the cover or radome of the antenna assembly be aerodynamic and stylish. Thus, the dimensions of the antenna assembly are relatively small, leaving very little room for the antenna elements within the interior enclosure of the radome. The antenna elements must be sized to fit within the radome, making transmitting/receiving in some frequency bands difficult. Additionally, closely positioning of the antenna elements within the radome leads to interference and reductions in antenna performance.

A need remains for an antenna assembly that is operable in multiple frequency bands.

BRIEF DESCRIPTION OF THE INVENTION

In one embodiment, an antenna assembly includes an antenna base having a ground plane. The antenna base extends along a central longitudinal axis between a front and a rear of the antenna base. The antenna base has a first side and a second side extending between the front and the rear. The antenna assembly includes a first cellular antenna configured to be operable over one or more cellular frequencies. The first cellular antenna is mounted to the antenna base along the central longitudinal axis. The antenna assembly includes a second cellular antenna configured to be operable over one or more cellular frequencies. The second cellular antenna is mounted to the antenna base along the central longitudinal axis. The antenna assembly includes a satellite antenna configured to be operable over one or more satellite frequencies. The satellite antenna configured to be operable for receiving Global Navigation Satellite System (GNSS) signals. The satellite antenna is mounted to the antenna base along the central longitudinal axis. The antenna assembly includes a first Wi-Fi antenna configured to be operable over one or more Wi-Fi frequencies. The first Wi-Fi antenna is mounted to the antenna base offset from the central longitudinal axis toward the first side. The antenna assembly includes a second Wi-Fi antenna configured to be operable over one or more Wi-Fi frequencies. The second Wi-Fi antenna is mounted to the antenna base offset from the central longitudinal axis toward the second side.

In another embodiment, an antenna assembly including an antenna base having a ground plane. The antenna base extends along a central longitudinal axis between a front and a rear of the antenna base. The antenna base has a first side and a second side extending between the front and the rear. The antenna assembly includes a first cellular antenna configured to be operable over one or more cellular frequencies. The first cellular antenna is mounted to the antenna base along the central longitudinal axis. The first cellular antenna includes a first monopole includes a first feed portion at a bottom of the first monopole and a first upper portion at a top of the first monopole. The upper portion is bent in a non-planar configuration. The antenna assembly includes a second cellular antenna configured to be operable over one or more cellular frequencies. The second cellular antenna is mounted to the antenna base along the central longitudinal axis. The second cellular antenna includes a second monopole includes a second feed portion at a bottom of the second monopole and a second upper portion at a top of the second monopole. The upper portion is bent in a non-planar configuration. The antenna assembly includes a satellite antenna configured to be operable over one or more satellite frequencies. The satellite antenna configured to be operable for receiving Global Navigation Satellite System (GNSS) signals. The satellite antenna is mounted to the antenna base along the central longitudinal axis. The antenna assembly includes a first integrated Wi-Fi antenna integrated with the first cellular antenna. The first integrated Wi-Fi antenna configured to be operable over one or more Wi-Fi frequencies. The first integrated Wi-Fi antenna is integrated into the first upper portion of the first monopole. The antenna assembly includes a second integrated Wi-Fi antenna integrated with the second cellular antenna. The second integrated Wi-Fi antenna configured to be operable over one or more Wi-Fi frequencies. The second integrated Wi-Fi antenna is integrated into the second upper portion of the second monopole.

In a further embodiment, an antenna assembly having an antenna base including a ground plane. The antenna assembly includes a first cellular antenna configured to be operable over one or more cellular frequencies. The first cellular antenna is mounted to the antenna base along the central longitudinal axis. The first cellular antenna includes a first monopole includes a first feed portion at a bottom of the first monopole connected to a first cellular feed extends through the base. The first monopole includes a first upper portion at a top of the first monopole. The upper portion is bent in a non-planar configuration. The first monopole includes a shorting leg extends between the first upper portion and the ground plane. The antenna assembly includes a second cellular antenna configured to be operable over one or more cellular frequencies. The second cellular antenna is mounted to the antenna base along the central longitudinal axis. The second cellular antenna includes a second monopole includes a second feed portion at a bottom of the second monopole connected to a second cellular feed extends through the base. The second monopole includes a second upper portion at a top of the second monopole. The upper portion is bent in a non-planar configuration. The second monopole includes a shorting leg extends between the second upper portion and the ground plane. The antenna assembly includes a satellite antenna configured to be operable over one or more satellite frequencies. The satellite antenna configured to be operable for receiving Global Navigation Satellite System (GNSS) signals. The satellite antenna is mounted to the antenna base along the central longitudinal axis. The antenna assembly includes a first Wi-Fi antenna configured to be operable over one or more Wi-Fi frequencies. The first Wi-Fi antenna is connected to a first Wi-Fi feed extends through the base. The antenna assembly includes a second Wi-Fi antenna configured to be operable over one or more Wi-Fi frequencies. The second Wi-Fi antenna is connected to a second Wi-Fi feed extends through the base.

BRIEF DESCRIPTION OF THE DRAWINGS

FIGS. 31A-1-31C-3 illustrates analysis results measured for an exemplary antenna assembly having the antenna arrangement as shown in FIG. 22 in accordance with an exemplary embodiment.

DETAILED DESCRIPTION OF THE INVENTION

Figure 1:
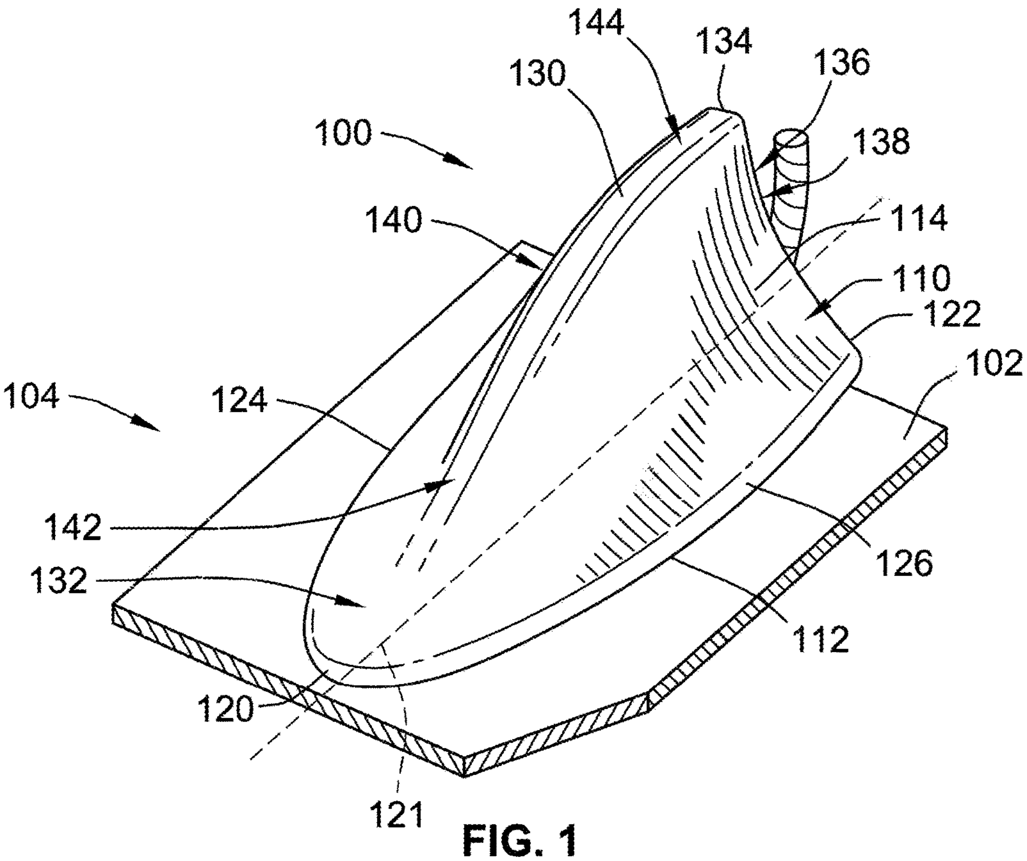
FIG. 1 illustrates an antenna assembly in accordance with an exemplary embodiment.
Figure 2:
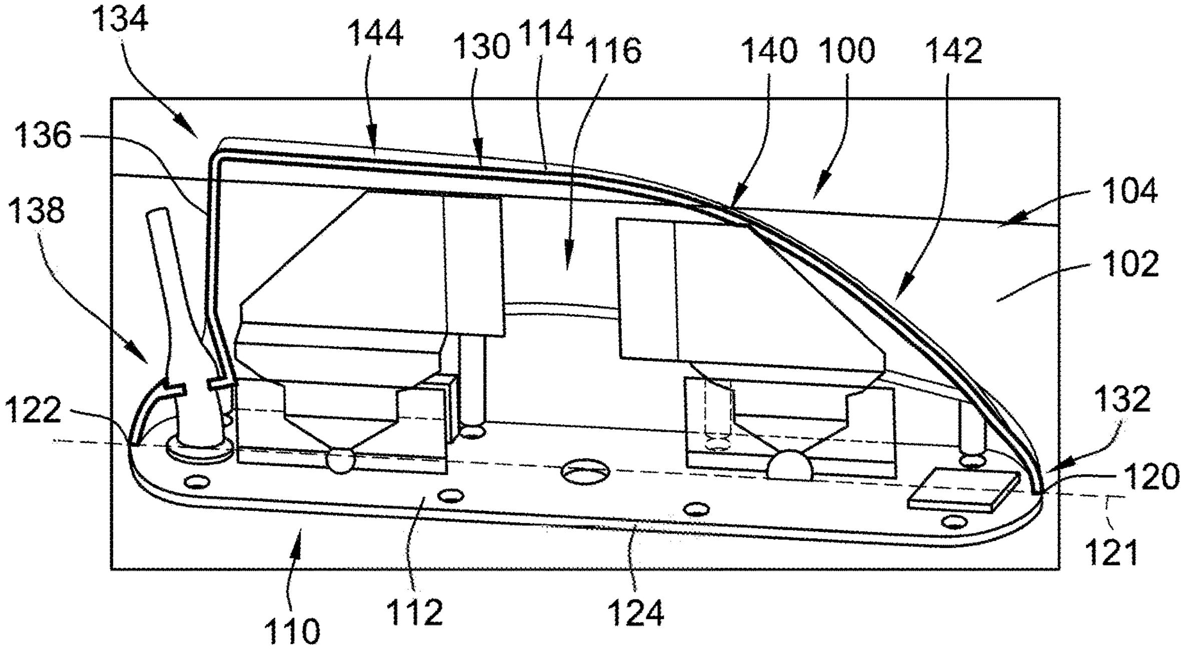
FIG. 2 is a sectional view of a portion of the antenna assembly in accordance with an exemplary embodiment.

FIG. 1 illustrates an antenna assembly 100 in accordance with an exemplary embodiment. FIG. 2 is a sectional view of a portion of the antenna assembly 100 in accordance with an exemplary embodiment. In various embodiments, the antenna assembly 100 is for use in a vehicle, such as for installation on a rooftop 102 of a vehicle 104. However, the antenna assembly 100 may have application in other applications, such as in a building.

The antenna assembly 100 integrates multiple antenna elements into a common structure mounted to the vehicle 104 for a multiband antenna automotive system. For example, the antenna assembly 100 may include cellular, Wi-Fi, Dedicated Short Range Communication (DSRC), and satellite antennas to provide versatility in communication for the vehicle 104. In various embodiments, the antenna assembly 100 may be operable over one or more cellular frequencies (for example, 4G, 5G, Long Term Evolution (LTE), and the like), operable over Wi-Fi frequencies, operable over terrestrial frequencies (for example, amplitude modulation (AM), frequency modulation (FM), and the like), operable over DSRC frequencies for "vehicle to everything" communication, operable over one or more satellite signals (e.g., Satellite Digital Audio Radio (SDARS), Global Navigation Satellite System (GNSS), and the like). The antenna assembly 100 may include antenna elements operable in other frequencies. The antenna elements of the antenna assembly 100 are arranged so as to avoid (or at least reduce) mutual coupling or interference and/or degradation of signals between the various antenna elements.

The antenna assembly 100 includes an antenna housing 110 holding the antenna components. The antenna housing 110 includes an antenna base 112 and a cover or radome 114 coupled to the antenna base 112. The antenna base 112 and the radome 114 form an interior enclosure 116 that receives the antenna components. Optionally, some antenna components may be located within and/or below the antenna base 112, such as circuit boards, cables, and the like. In an exemplary embodiment, the antenna elements are located above the antenna base 112, under the radome 114, inside the interior enclosure 116. The antenna elements may be mounted to the antenna base 112 and covered by the radome 114. Optionally, at least one of the antenna elements may extend through the radome 114 to the exterior of the interior enclosure.

The antenna housing 110 extends between a front 120 and a rear 122. The antenna housing 110 extends along a central longitudinal axis 121 between the front 120 and the rear 122. The radome 114 has a first or right side 124 and a second or left side 126 between the front 120 and the rear 122. The right side 124 and the left side 126 may be generally parallel to the central longitudinal axis 121. In an exemplary embodiment, the radome 114 is aerodynamically designed and has a shark-fin shape. The radome 114 has a ridge 130 extending between the front 120 and the rear 122. The ridge 130 may be generally aligned with the central longitudinal axis 121, such as centered between the right side 124 and the left side 126. The ridge 130 extends from a nose 132 at the front 120 to a tip 134 at the rear 122. The radome 114 has a tail 136 at the rear 122 that extends between the tip 134 and the antenna base 112. The tail 136 may include an indent 138 such that the rear 122 is concave shaped. One of the antenna elements may be located in the indent 138, such as rearward of the tail 136. For example, a whip antenna may be located rearward of the tail 136.

The tip 134 is at an elevated height compared to the nose 132. For example, the ridge 130 may have an increasing height from the front 120 to the rear 122. In the illustrated embodiment, the nose 132 may have near zero height at the front 120. Optionally, the radome 114 may be tallest at or near the tip 134. However, in other embodiments, the radome 114 may curve downward at the rear 122 such that the tallest portion of the radome 114 is located along the ridge 130 at some location between the front 120 and the rear 122. In various embodiments, the radome 114 may have a maximum height relative to the rooftop 102 of the vehicle 104 of approximately 80 mm. In other various embodiments, the radome 114 may be shorter, such as having a maximum height relative to the rooftop 102 of the vehicle 104 of approximately 60 mm.

In an exemplary embodiment, the radome 114 includes a bulge 140 along the ridge 130. The bulge 140 may be approximately centered along the ridge 130 between the front 120 and the rear 122. The ridge 130 includes a front portion 142 forward of the bulge 140 and a rear portion 144 rearward of the bulge 140. The front portion 142 of the ridge 130 is steeper and the rear portion 144 is flatter. For example, the ridge 130 rises quicker at the front to increase the size or volume of the interior enclosure 116 for receiving the antenna elements.

Figure 3:
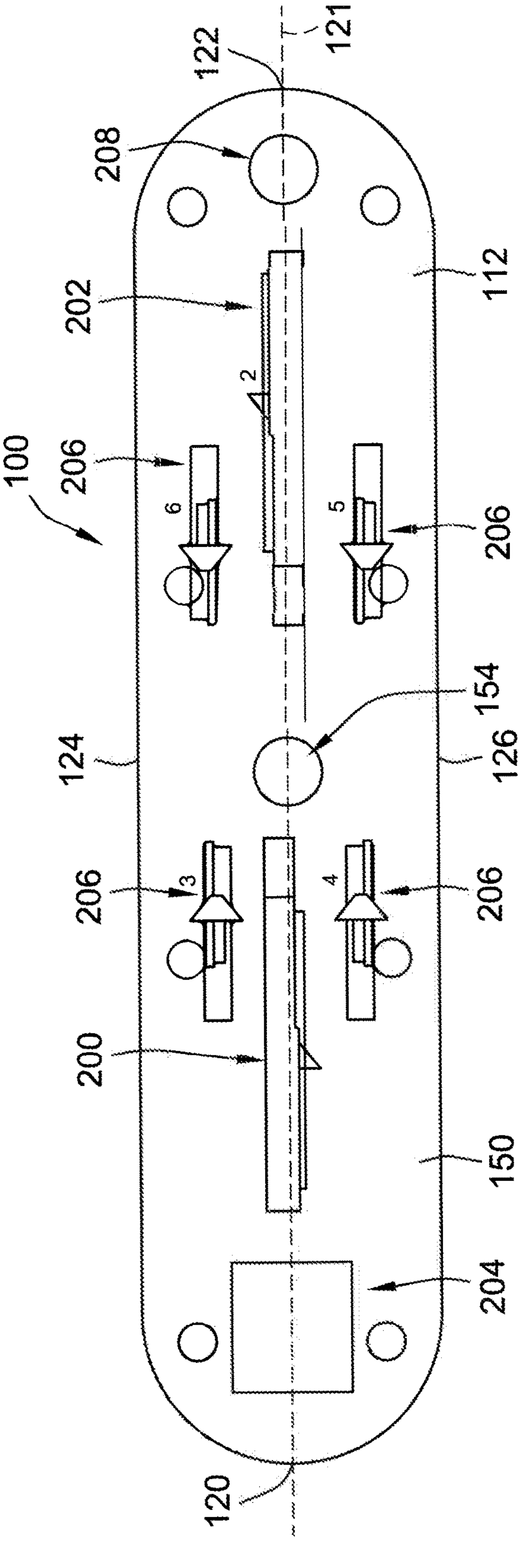
FIG. 3 is a top view of a portion of the antenna assembly illustrating components of the antenna assembly in accordance with an exemplary embodiment.
Figure 4:
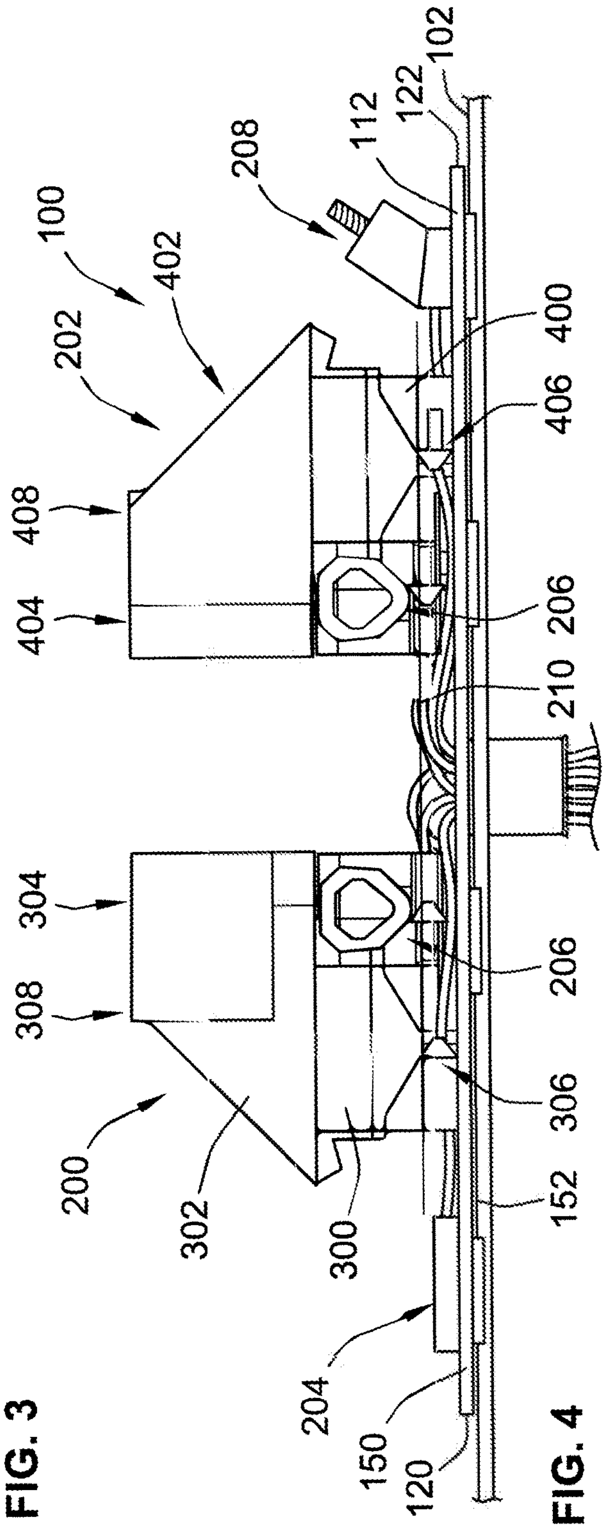
FIG. 4 is a side view of a portion of the antenna assembly illustrating components of the antenna assembly in accordance with an exemplary embodiment.
Figure 5:
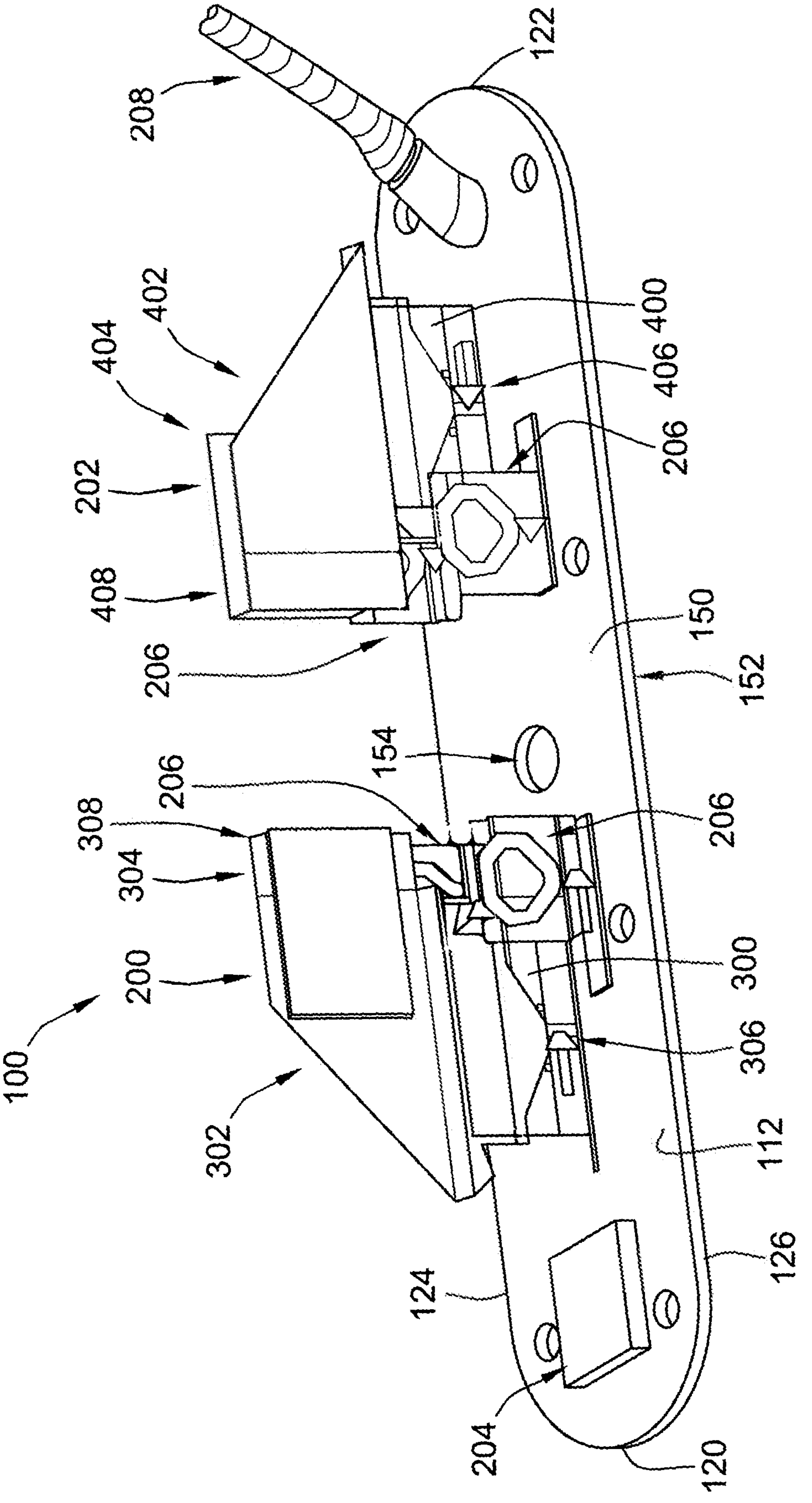
FIG. 5 is a perspective view of a portion of the antenna assembly illustrating components of the antenna assembly in accordance with an exemplary embodiment.

FIG. 3 is a top view of a portion of the antenna assembly 100 illustrating components of the antenna assembly 100. FIG. 4 is a side view of a portion of the antenna assembly 100 illustrating components of the antenna assembly 100. FIG. 5 is a perspective view of a portion of the antenna assembly 100 illustrating components of the antenna assembly 100. The antenna assembly 100 is shown in FIGS. 3-5 without the radome 114 (FIG. 2) to illustrate the antenna elements.

In an exemplary embodiment, the antenna base 112 includes a substrate 150. The antenna elements may be mounted to the substrate 150. For example, the substrate 150 may support the antenna elements. In the illustrated embodiment, the substrate 150 is obround, such as having an oval shape being curved at the front and the rear with parallel sides therebetween. The substrate 150 may have other shapes in alternative embodiments. In various embodiments, the substrate 150 is a metal plate. For example, the substrate 150 may be a die-cast component. The substrate 150 may be mounted to the vehicle 104, such as to the rooftop 102 of the vehicle 104. In an exemplary embodiment, the substrate 150 includes and/or defines a ground plane 152 to provide a ground reference for the antenna elements. In various embodiments, the substrate may be a circuit board having one or more circuits, such as a ground circuit defining the ground plane 152 and one or more feed circuits to feed the antenna elements. For example, the antenna elements may be soldered to circuits or conductors of the circuit board. Alternatively, the feeds for the antenna elements may be provided by feed cables passing through the substrate 150, such as through an opening 154.

In an exemplary embodiment, the antenna assembly 100 includes a first or primary cellular antenna 200 configured to be operable over one or more cellular frequencies, a second or secondary cellular antenna 202 configured to be operable over one or more cellular frequencies, a satellite antenna 204 configured to be operable over one or more satellite frequencies, one or more Wi-Fi antennas 206 configured to be operable over one or more Wi-Fi frequencies, and a whip antenna 208 configured to be operable over terrestrial frequencies. The antennas 200, 202, 204, 206, 208 are mounted to the antenna base 112, such as to the substrate 150. In an exemplary embodiment, the first and second cellular antennas 200, 202 are monopole antennas. In an exemplary embodiment, the Wi-Fi antennas 206 are monopole antennas. In the illustrated embodiment, the Wi-Fi antennas 206 are standalone Wi-Fi antennas mounted to the antenna base 112 separate from the cellular antennas 200, 202. However, in alternative embodiments, one or more of the Wi-Fi antennas 206 may be integrated Wi-Fi antennas integrated with the cellular antennas 200, 202. The satellite antenna 204 may be a patch antenna.

In an exemplary embodiment, feed cables 210 are terminated to the antenna elements. The feed cables 210 may be coaxial cables. The feed cables 210 pass through the opening 154 in the substrate 150 for connection to the corresponding antenna elements.

In an exemplary embodiment, the first and second cellular antennas 200, 202 are multiple-in, multiple-out (MIMO) antenna elements that cover wide frequency bands. In an exemplary embodiment, the first and second cellular antennas 200, 202 are arranged along the central longitudinal axis 121. For example, the first cellular antenna 200 is located closer to the front 120 and the second cellular antenna 202 is located closer to the rear 122. The first and second cellular antennas 200, 202 may be approximately centered between the first side 124 and the second side 126.

In an exemplary embodiment, the satellite antenna 204 is arranged along the central longitudinal axis 121. For example, the satellite antenna 204 may be located forward of the first and second cellular antennas 200, 202, such as proximate to the front 120. In various embodiments, the satellite antenna 204 has a short profile and is positionable at the nose of the radome 114. However, other locations are possible in alternative embodiments, such as between the first and second cellular antennas 200, 202 or proximate to the rear 122.

In an exemplary embodiment, the whip antenna 208 is arranged along the central longitudinal axis 121. For example, the whip antenna 208 may be located rearward of the first and second cellular antennas 200, 202, such as proximate to the rear 122. The whip antenna 208 may be a monopole antenna. The whip antenna 208 may be omni-directional having 360° signal coverage. In various embodiments, the whip antenna 208 is configured to pass through an opening in the radome 114 to the exterior of the radome 114. However, other locations are possible in alternative embodiments.

In an exemplary embodiment, the Wi-Fi antennas 206 are mounted to the antenna base 112 offset from the central longitudinal axis 121, such as closer to the right side 124 or closer to the left side 126. The Wi-Fi antennas 206 may flank the cellular antennas 200, 202. In the illustrated embodiment, four of the Wi-Fi antennas 206 are shown, with two of the Wi-Fi antennas 206 flanking the first cellular antenna 200 on opposite sides of the first cellular antenna 200 and with two of the Wi-Fi antennas 206 flanking the second cellular antenna 202 on opposite sides of the second cellular antenna 202. However, other locations are possible in alternative embodiments. Greater or fewer Wi-Fi antennas 206 may be provided in alternative embodiments depending on the particular application and needs. The antenna base 112 provides multiple mounting locations for the various antenna elements.

In an exemplary embodiment, the first and second cellular antennas 200, 202 cover a broad frequency range to meet bandwidth requirements, such as to cover the 4G cellular network and/or the 5G cellular network and/or the LTE cellular network. For example, the first and second cellular antennas 200, 202 may cover a frequency range from approximately 617 MHz to 7125 MHz. In various embodiments, the first and second cellular antennas 200, 202 may be designed for targeted operation in both the 617-960 MHz range and the 1690-7125 MHz range. In an exemplary embodiment, the satellite antenna 204 is used for satellite positioning, such as for use with a GPS system of the vehicle. The satellite antenna 204 may be a dual band (L1 and L5) antenna element. The satellite antenna 204 may have a low axial ratio to provide high precision positioning for assisted driving and self-driving. In an exemplary embodiment, the satellite antenna 204 may be used for satellite radio. In various embodiments, the satellite antenna 204 may cover one or more frequency ranges, such as a frequency range from approximately 1559.052-1607 MHz and/or 1166-1186 MHz. In an exemplary embodiment, the Wi-Fi antennas 206 may be used for Wi-Fi communication and or Bluetooth communication in and around the vehicle. In various embodiments, the Wi-Fi antennas 206 may cover one or more frequency ranges, such as a frequency range from approximately 2400-2500 MHz and/or 4900-7125 MHz. The Wi-Fi antennas 206 may cover the Bluetooth Low Energy 2.4 GHz-2.48 GHz frequency range. In an exemplary embodiment, whip antenna 208 may be used for terrestrial communication e.g. two-way radio or land mobile radio system. In various embodiments, the whip antenna 208 may cover one or more frequency ranges, such as the VHF, UHF, and 700-800 MHz bands. In an exemplary embodiment, the antenna elements may be used for communication with the surroundings, such as vehicle-to-vehicle communication, vehicle-to-infrastructure communication, vehicle-to-pedestrian communication, and the like.

The first cellular antenna 200 is configured to be operable for receiving and/or transmitting communication signals within one or more cellular frequency bands (for example, 4G, 5G, Long Term Evolution (LTE), and the like). In an exemplary embodiment, the first cellular antenna 200 includes a dielectric support 300 and an antenna element 302 coupled to the dielectric support 300. The dielectric support is coupled to the antenna base 112, such as to the substrate 150. The dielectric support 300 may be a circuit board. In various embodiments, the antenna element 302 includes a stamped and formed part coupled to the dielectric support 300. Optionally, at least a portion of the antenna element 302 may be a circuit element of the circuit board of the dielectric support 300. In other alternative embodiments, the first cellular antenna 200 is provided without the dielectric support 300, such as having a stamped and formed conductor structure that is self-supporting and free-standing.

In an exemplary embodiment, the first cellular antenna 200 is generally contained within a small footprint extending along the central longitudinal axis 121. The first cellular antenna 200 is configured to be aligned with the ridge of the radome 114 to allow maximum length of the antenna element of the first cellular antenna 200 for sufficient radiation and antenna efficiency. The shape of the first cellular antenna 200 may correspond to the shape of the radome 114, such as having a chamfer at the front of the first cellular antenna 200 that is complementary to the shape of the radome 114. In an exemplary embodiment, the antenna element 302 includes a monopole 304 having a feed portion 306 at a bottom of the monopole 304 and an upper portion 308 at a top of the monopole 304. The upper portion 308 is top loaded. The upper portion 308 includes multiple sections to add additional length to the monopole 304. The sections are folded or bent into a non-planar shape. The upper portion 308 uses width to gain length within a given height of the first cellular antenna 200. For example, one or more of the sections are U-shaped or C-shaped being folded over into parallel, overlapping orientations. In an exemplary embodiment, the upper portion 308 may be grounded to the ground plane 152, such as using a shorting leg extending down to the ground plane 152. In an exemplary embodiment, the feed portion 306 is stepped inward at the bottom to a feed point. The feed portion 306 may include one or more slanted edges between the steps. The feed point may be approximately centered along the first cellular antenna 200. The feed portion 306 may include shorting elements and/or matching elements along the circuit board.

In an exemplary embodiment, the second cellular antenna 202 is identical to the first cellular antenna 200 but inverted 180° (for example, rear facing rather than forward facing). However, the second cellular antenna 202 may be designed differently than the first cellular antenna 200 in alternative embodiments, such as for targeting different operating frequencies. The second cellular antenna 202 is configured to be operable for receiving and/or transmitting communication signals within one or more cellular frequency bands (for example, 4G, 5G, Long Term Evolution (LTE), and the like). In an exemplary embodiment, the second cellular antenna 202 includes a dielectric support 400 and an antenna element 402 coupled to the dielectric support 400. The dielectric support 400 is coupled to the antenna base 112, such as to the substrate 150. The dielectric support 400 may be a circuit board. In various embodiments, the antenna element 402 includes a stamped and formed part coupled to the dielectric support 400. Optionally, at least a portion of the antenna element 402 may be a circuit element of the circuit board of the dielectric support 400. In other alternative embodiments, the second cellular antenna 202 is provided without the dielectric support 400, such as having a stamped and formed conductor structure that is self-supporting and free-standing.

In an exemplary embodiment, the second cellular antenna 202 is generally contained within a small footprint extending along the central longitudinal axis 121. The second cellular antenna 202 is configured to be aligned with the ridge of the radome 114 to allow maximum length of the antenna element of the second cellular antenna 202 for sufficient radiation and antenna efficiency. The shape of the second cellular antenna 202 may correspond to the shape of the radome 114, such as having a chamfer at the rear of the second cellular antenna 202 that is complementary to the shape of the radome 114. In an exemplary embodiment, the antenna element 402 includes a monopole 404 having a feed portion 406 at a bottom of the monopole 404 and an upper portion 408 at a top of the monopole 404. The upper portion 408 is top loaded. The upper portion 408 includes multiple sections to add additional length to the monopole 404. The sections are folded or bent into a non-planar shape. The upper portion 408 uses width to gain length within a given height of the second cellular antenna 202. For example, one or more of the sections are U-shaped or C-shaped being folded over into parallel, overlapping orientations. In an exemplary embodiment, the upper portion 408 may be grounded to the ground plane 152, such as using a shorting leg extending down to the ground plane 152. In an exemplary embodiment, the feed portion 406 is stepped inward at the bottom to a feed point. The feed portion 406 may include one or more slanted/curve edges between the steps. The feed point may be approximately centered along the second cellular antenna 202. The feed portion 406 may include shorting elements and/or matching elements along the circuit board.

In an exemplary embodiment, the antenna base 112 of the antenna assembly 100 has a relatively small footprint and the antenna elements are positioned in close proximity to each other to fit within the footprint. The antenna elements are positioned relative to each other such that there is sufficient de-correlation, sufficiently low coupling, and sufficient isolation between the antenna elements. The antenna elements are positioned relative to each other to fit within the radome 114 (for example, within the shark-fin shape of the radome 114). For example, placement of the antenna elements is positioned based on height, width, and length dimensions of the antenna elements to fit within the interior enclosure of the radome 114 while limiting matching or coupling between the antenna elements for efficient operation of the various antenna elements.

Figure 6:
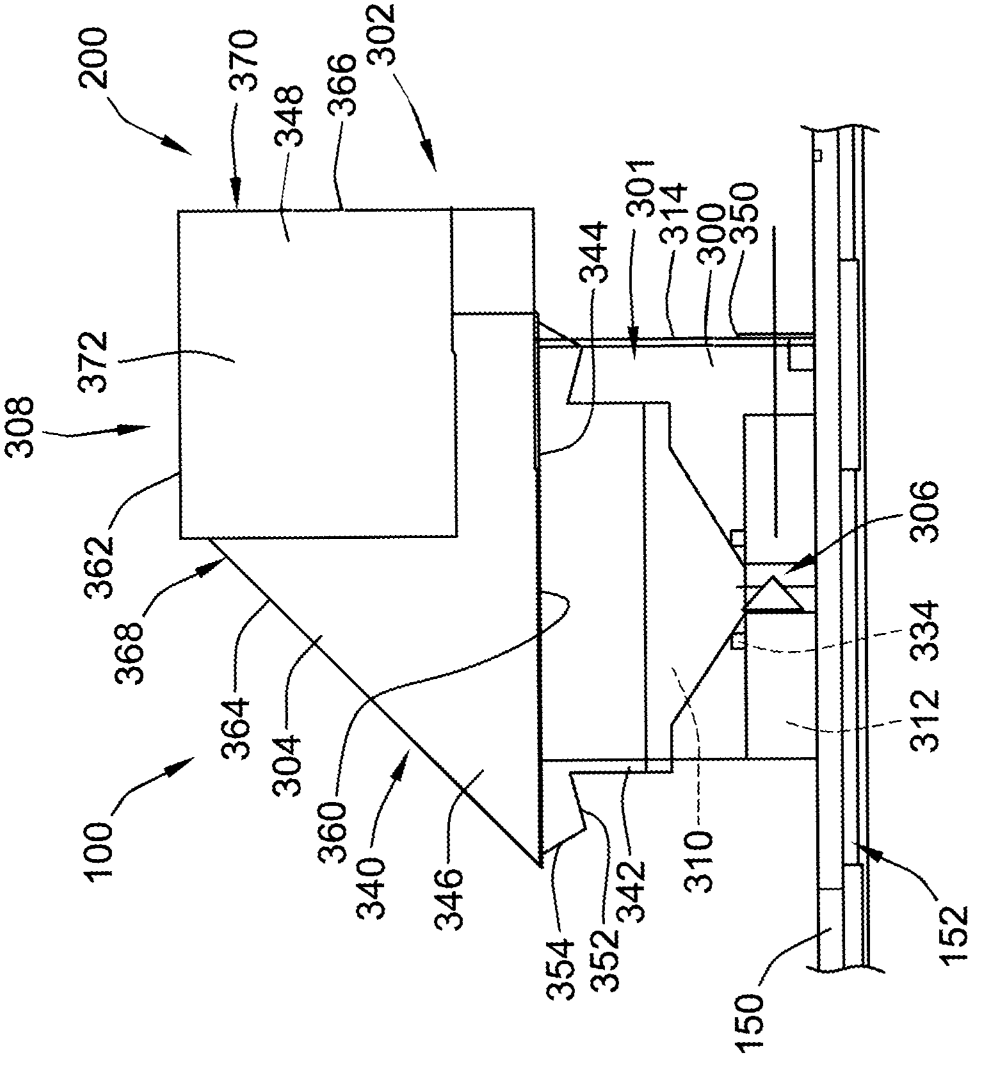
FIG. 6 is a first side view of a portion of the antenna assembly showing the cellular antenna in accordance with an exemplary embodiment.
Figure 7:
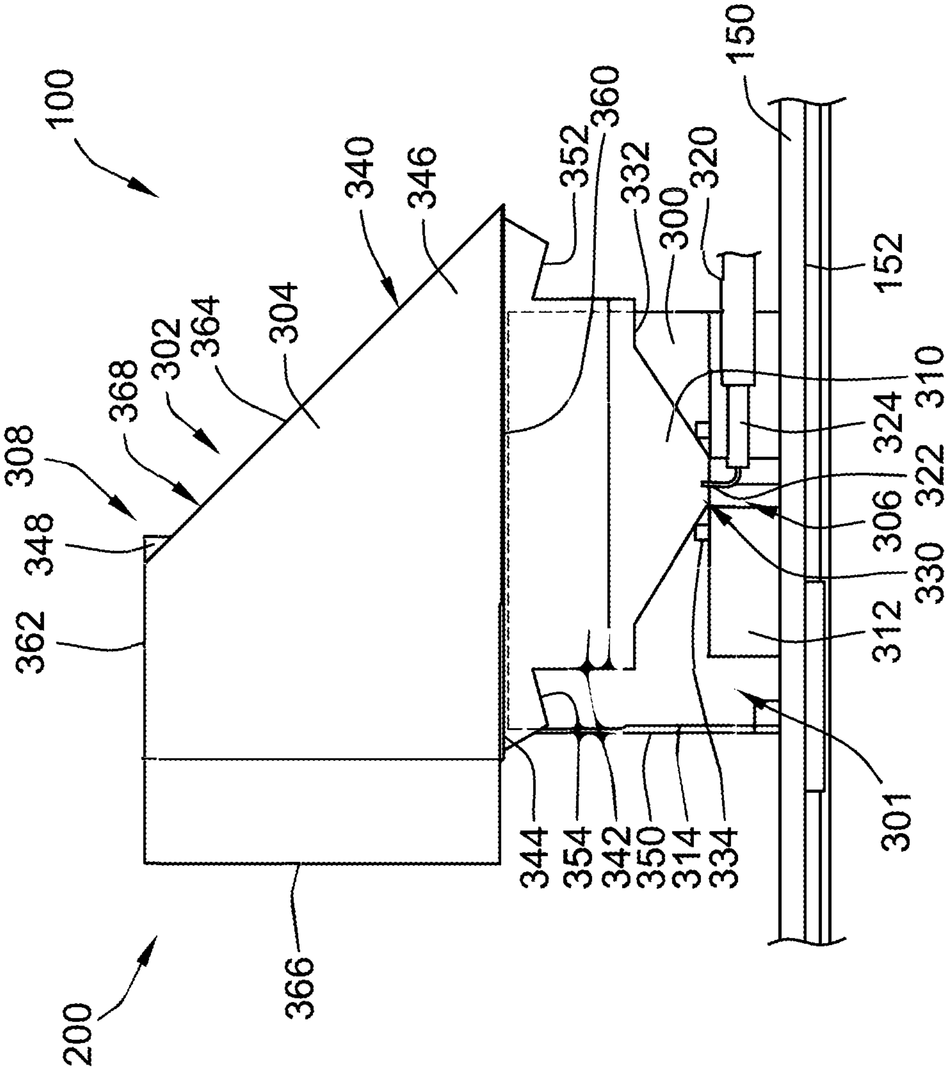
FIG. 7 is a second side view of a portion of the antenna assembly showing the cellular antenna in accordance with an exemplary embodiment.
Figure 8:
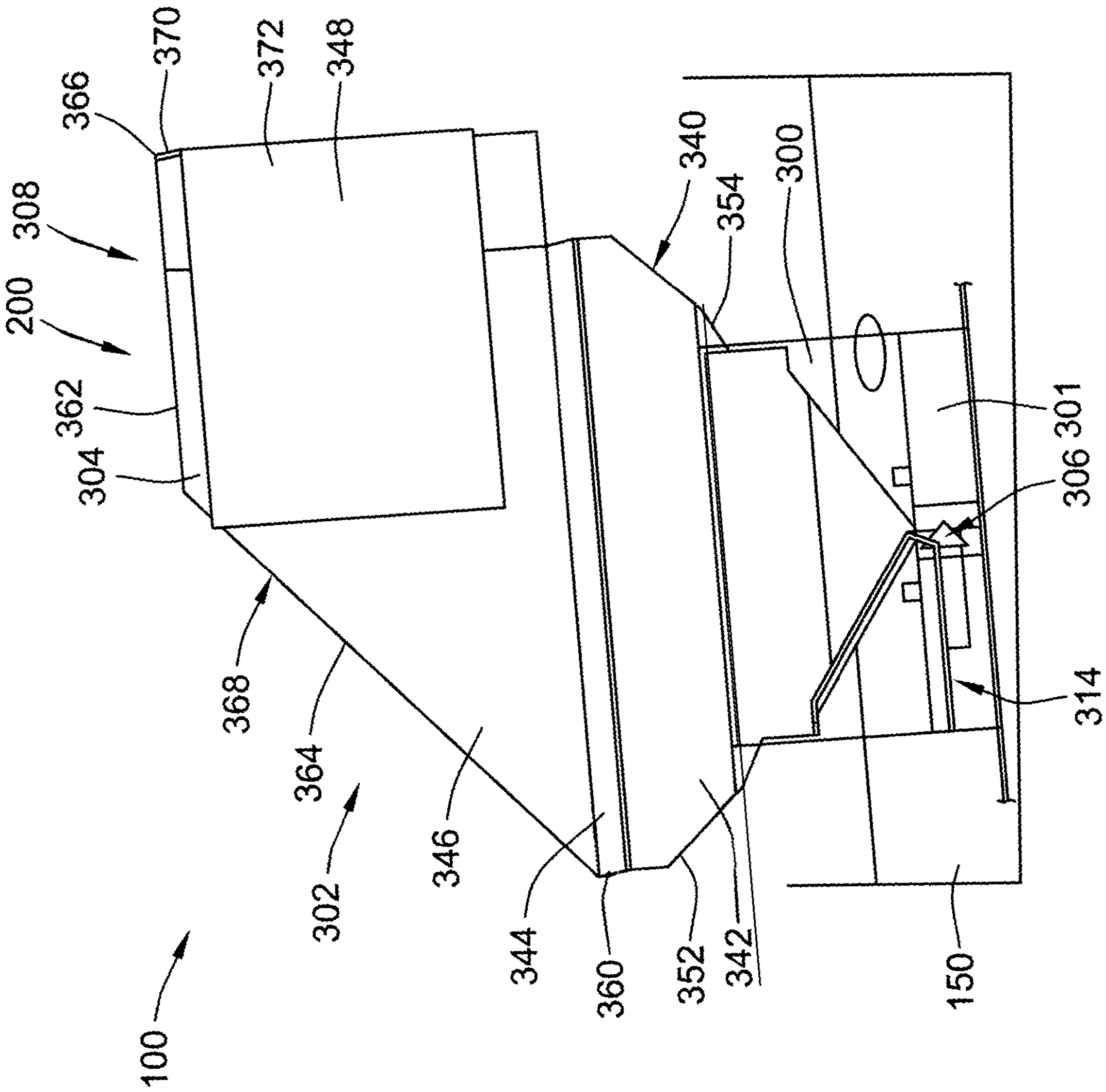
FIG. 8 is a first side perspective view of a portion of the antenna assembly showing the cellular antenna in accordance with an exemplary embodiment.
Figure 9:
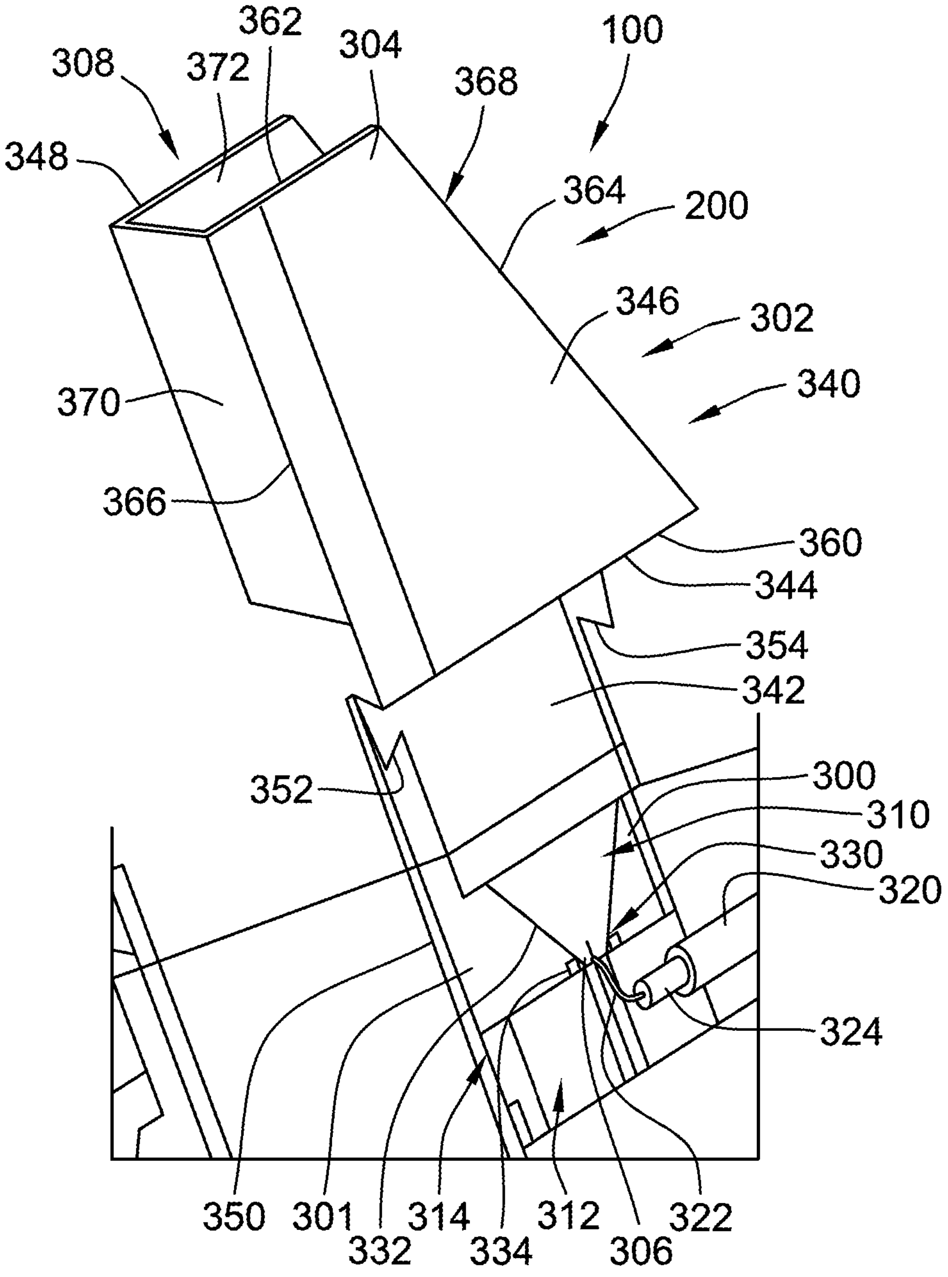
FIG. 9 is a second side perspective view of a portion of the antenna assembly 100 showing the cellular antenna 200 in accordance with an exemplary embodiment.

FIG. 6 is a first side view of a portion of the antenna assembly 100 showing the cellular antenna 200 in accordance with an exemplary embodiment. FIG. 7 is a second side view of a portion of the antenna assembly 100 showing the cellular antenna 200 in accordance with an exemplary embodiment. FIG. 8 is a first side perspective view of a portion of the antenna assembly 100 showing the cellular antenna 200 in accordance with an exemplary embodiment. FIG. 9 is a second side perspective view of a portion of the antenna assembly 100 showing the cellular antenna 200 in accordance with an exemplary embodiment. The second cellular antenna 202 may be similar to the first cellular antenna 200 including similar components and is not described in the same amount of detail as the first cellular antenna 200. References to the second cellular antenna 202 herein may be referred to using the identifier "second" rather than "first".

The first cellular antenna 200 includes the dielectric support 300 and the antenna element 302 coupled to the dielectric support 300. In an exemplary embodiment, the antenna element 302 includes multiple branches or sections arranged to cover different frequency bands.

In an exemplary embodiment, the dielectric support 300 includes a circuit board 301. However, in alternative embodiments, the dielectric support 300 may be a formed dielectric part or an overmolded part that is devoid of circuits or conductors but rather is only used for mechanical support of the antenna element 302. The dielectric support 300 may support the antenna element 302 relative to the substrate 150. The dielectric support 300 provides a mounting interface to the circuit substrate 150. In the illustrated embodiment, the dielectric support 300 is provided at the bottom of the first cellular antenna 200 and the antenna element 302 extends upward beyond the top of the dielectric support 300. However, in alternative embodiments, the dielectric support 300 may extend the entire height of the first cellular antenna 200. In the illustrated embodiment, the dielectric support 300 is rectangular in shape with a bottom edge of the dielectric support 300 resting on the substrate 150. However, the dielectric support may have other shapes in alternative embodiments. In various embodiments, the dielectric support is oriented vertically, such as perpendicular to the substrate 150. In an exemplary embodiment, the antenna element 302 is isolated from the ground plane 152, such as by the dielectric support 300. For example, the dielectric support 300 may hold the antenna element 302 at a suspended or elevated position relative to the substrate 150 and the ground plane 152.

In an exemplary embodiment, the circuit board 301 includes a feed circuit 310, a ground circuit 312, and a shorting circuit 314 defining a shorting leg 350 to the ground circuit 312 and/or the ground plane 152. The circuit board 301 may include additional circuits in various embodiments. The stamped and formed upper portion 308 of the monopole 304 is connected to the feed circuit 310, such as being welded, soldered, riveted, or otherwise electrically connected to the feed circuit 310. The stamped and formed upper portion 308 extends upward from the upper edge of the circuit board 301.

The feed circuit 310 and the ground circuit 312 are provided at the feed portion 306 of the first cellular antenna 200. The feed circuit 310 and the ground circuit 312 may be defined by traces, vias or other circuits of the circuit board 301. A feed cable 320 is electrically connected to the feed portion 306. For example, the feed cable 320 is electrically connected to the feed circuit 310 and the ground circuit 312. In an exemplary embodiment, a center conductor 322 of the feed cable 320 is connected to the feed circuit 310, such as being soldered to the feed circuit 310. A cable shield 324 of the feed cable 320 is connected to the ground circuit 312, such as being soldered to the ground circuit 312. The ground circuit 312 may be electrically connected to the ground plane 152 of the substrate 150. The shorting path defined by the shorting circuit 314 is electrically connected to the ground circuit 312 and/or the ground plane 152. The shorting circuit 314 may be defined by traces, vias or other circuits of the circuit board 301. In the illustrated embodiment, the ground circuit 312 is located near the bottom edge of the circuit board 301. The ground circuit 312 may be oriented vertically. In the illustrated embodiment, the feed cable 320 is connected to the feed circuit 310 and the ground circuit 312 near a central location of the circuit board 301, such as approximately centered between a front edge and a rear edge of the circuit board 301. Other locations are possible in alternative embodiments.

In an exemplary embodiment, the feed circuit 310 emanates from the central location of the circuit board 301. For example, the feed circuit 310 may have a feed point 330 approximately centered between the front edge and the rear edge of the circuit board 301. The center conductor 322 is connected to the feed circuit 310 at the feed point 330. The center conductor 322, and the feed circuit 310 at the feed point 330 have a smaller area to increase the inductance to balance the capacitive loading of the large area of the monopole radiating element. In an exemplary embodiment, the circuit board 301 has a masking layer at the feed point 330 masking the center conductor 322 from the ground circuit 312. The feed circuit 310 includes steps 332 extending outward from the feed point 330 toward the front and rear edges of the circuit board 301. Optionally, the steps 332 may have slanted and/or curve edges along portions of the steps 332. The slanted and/or curve edges along the multiple steps 332 may offer flexibility for optimization for wide bandwidth. In an exemplary embodiment, matching studs 334 may extend between the feed circuit 310 and the ground circuit 312. The matching studs 334 are located relative to the feed point 330 to control capacitance and inductance along the monopole radiating element to improve one or more antenna characteristics of the first cellular antenna 200.

The shorting circuit 314 provides a shorting path between the monopole radiating element and the ground, such as the ground circuit 312 and/or the ground plane 152. The shorting circuit 314 may enhance matching of the lower profile and the upper profile of the monopole radiating element. In the illustrated embodiment, the shorting circuit 314 is a circuit of the circuit board 301. The shorting circuit 314 may be provided on the same side of the circuit board 301 as the feed circuit 310 and/or the ground circuit 312. In other various embodiments, the shorting circuit 314 may be provided on the opposite sides of the circuit board 301 as the feed circuit 310 and/or the ground circuit 312. In other various embodiments, rather than the shorting circuit 314 being a circuit of the circuit board 301, the shorting element may be stamped and formed with the stamped and formed monopole radiating element of the upper portion 308. Such shorting leg 350 may be supported by the circuit board 301, such as extending along the rear edge of the circuit board 301.

In an exemplary embodiment, the first cellular antenna 200 includes a stamped and formed, monopole radiating element 340 (also referred to hereinafter as a radiator 340) that is coupled to the circuit board 301. For example, the radiating element 340 is connected to the feed circuit 310. The radiating element 340 is formed from a metal plate that is stamped and formed into a particular shape. In an exemplary embodiment, the radiating element 340 includes a connecting segment 342 connected to the circuit board 301, an extension segment 344 extending from the connecting segment 342 and bent out of plane from the connecting segment 342, a main body 346 extending from the connecting segment 344 and bent out of plane from the connecting segment 342, and a wrapped segment 348 extending from the main body 346 out of plane from the main body 346. The main body 346 and the wrapped segment 348 define the upper portion 308 of the monopole 304. The size and shape of the radiating element 340 may be designed to occupy an effective value for controlling bandwidth, efficiency, and providing a longer electrical length for the radiating element 340. In an exemplary embodiment, the radiating element 340 is asymmetrical, being sized and shaped to fit within the shark fin shape of the radome 114. The upper portion 308 of the monopole 304 is top loaded to give a long electrical path. In an exemplary embodiment, the upper portion 308 is shorted to the ground plane 152 by a shorting path, such as the shorting circuit 314 or a shorting leg 350 that is stamped from the upper portion 308 and tied directly to the ground plane 152 or ground circuit 312. The shorting path may improve matching of the antenna, such as for the lower edge frequency band (for example, 617 MHz) to maintain a lower profile compared to conventional monopole antennas.

In an exemplary embodiment, the connecting segment 342 extends generally vertically. The connecting segment 342 extends between a front and a rear of the antenna. The connecting segment 342 is located at the bottom of the radiating element 340. The connecting segment 342 is configured overlap a portion of the feed circuit 310. For example, the connecting segment 342 may extend along one side of the circuit board 301 for mechanical and electrical connection to the feed circuit 310. In various embodiments, the connecting segment 342 may be connected to the circuit board 301 using a fastener, such as a threaded fastener, a rivet, or other type of fastener. In various embodiments, the connecting segment 342 may be soldered to the feed circuit 310. The connecting segment 342 includes one or more steps 352 that correspond with the steps 332 of the feed circuit 310. The steps 352 may include slanted and/or curve edges 354 defining portions of the steps 352. The steps 352 are provided at the front and the rear of the connecting segment 342 to increase the size of the connecting segment 342 as the antenna transitions from the feed portion 306 to the upper portion 308. The shorting circuit 314 may be connected to the connecting segment 342.

The extension segment 344 extends from the connecting segment 342, such as at a bend line. In an exemplary embodiment, the extension segment 344 is bent approximately perpendicular to the connecting segment 342. For example, the extension segment 344 may be oriented generally horizontally. In various embodiments, the extension segment 344 is located above the circuit board 301. Optionally, the extension segment 344 may rest on the upper edge of the circuit board 301. As such, the circuit board 301 supports the radiating element 340. The extension segment 344 increases an overall length of the radiating element 340 without increasing the height of the radiating element 340. For example, the extension segment 344 widens the monopole 304 and shifts the main body 346 to an offset position relative to the connecting segment 342 and the circuit board 301.

The main body 346 extends from the extension segment 344, such as at a bend line. The main body 346 may be oriented generally perpendicular to the extension segment 344. In an exemplary embodiment, the main body 346 extends upward from the extension segment 344. Optionally, the main body 346 may be oriented generally vertically. The main body 346 includes a bottom edge 360, a top edge 362, a first side edge 364 (for example, front edge), and a second side edge 366 (for example, rear edge). The bottom edge 360 is connected to the extension segment 344. In an exemplary embodiment, the main body 346 is taller at the rear and shorter at the front. In an exemplary embodiment, the side edge 364 includes a chamfer 368 angled transverse to the top edge 362 and/or the bottom edge 360. The chamfer 368 recesses the top edge 362 relative to the bottom edge 360. For example, the top edge 362 may begin rearward of the bottom edge 360. In the illustrated embodiment, the chamfer 368 is oriented at approximately 45°. However, the chamfer 368 may be at other angles in alternative embodiments. The chamfer 368 may include multiple segments at various angles relative to each other between the top edge 362 and the bottom edge 360. The chamfer 368 is provided to accommodate the shape of the radome 114 to avoid structural interference with the radome 114. For example, the angle of the chamfer 368 may approximate the angle of the ridge of the radome 114. The chamfer 368 forms an asymmetrical shape for the radiating element 340, which affects the residence of the antenna, such as by reducing the effectiveness of the top loading effect to push the lower edge resonance to lower frequencies. In the illustrated embodiment, the rear side edge 366 is oriented generally vertically. However, in alternative embodiments, the rear side edge 366 may additionally or alternatively include a chamfer. The rear side edge 366 may be located rearward of the extension segment 344.

The wrapped segment 348 extends from the main body 346, such as at a bend line. The wrapped segment 348 extends from the rear edge 366 in the illustrated embodiment. However, the wrapped segment 348 may extend from the top edge 362 in alternative embodiments. The wrapped segment 348 is U-shaped or C-shaped. For example, the wrapped segment 348 is folded over into a parallel, overlapping orientation relative to the main body 346. For example, the wrapped segment 348 may include two portions (extension portion 370 and secondary portion 372) that are bent at right angles to form the wrapped segment 348. In the illustrated embodiment, the extension portion 370 is provided at the rear of the radiating element 340 and the secondary portion 372 extends forwardly from the extension portion 370. The extension portion 370 is rectangular in shape in the illustrated embodiment, however, the extension portion 370 may have other shapes in alternative embodiments, such as including a chamfered front edge that mirrors the shape of the main body 346. The wrapped segment 348 adds length to the radiating element 340 without increasing the overall height of the radiating element 340. The secondary portion 372 may be oriented parallel to and spaced apart from the main body 346. Optionally, the extension portion 370 may have a width approximately equal to a width of the extension segment 344 such that the secondary portion 372 is generally coplanar with the connecting segment 342.

Figure 10:
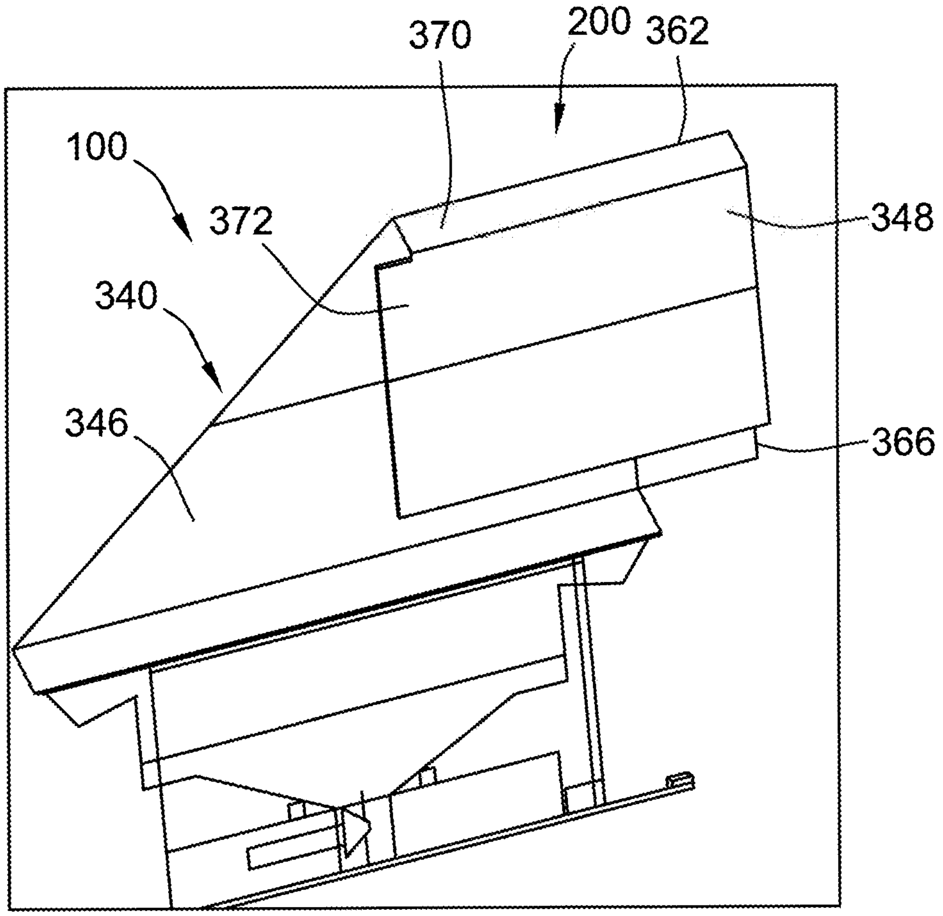
FIG. 10 is a side perspective view of a portion of the antenna assembly showing the cellular antenna in accordance with an exemplary embodiment.

FIG. 10 is a side perspective view of a portion of the antenna assembly 100 showing the cellular antenna 200 in accordance with an exemplary embodiment. FIG. 10 illustrates the radiating element 340 having the wrapped segment 348 extending from the top edge 362 rather than the side edge 366. For example, the extension portion 370 is bent along the top edge 362 and the secondary portion 372 extends downward from the extension portion 370 parallel to and spaced apart from the main body 346.

Figure 11:
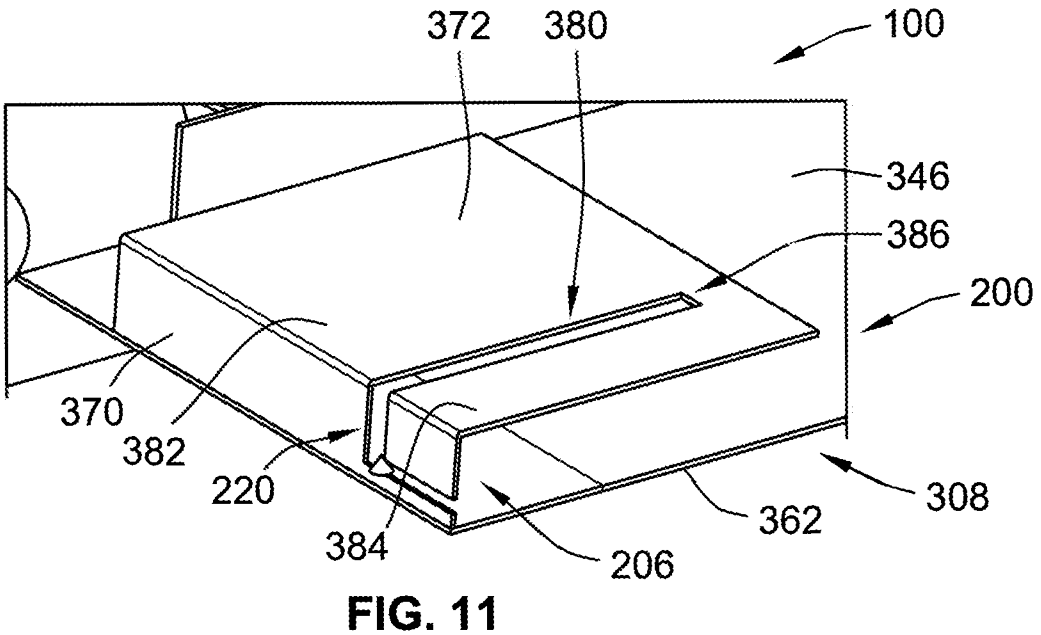
FIG. 11 is a perspective view of a portion of the cellular antenna in accordance with an exemplary embodiment showing an integrated Wi-Fi antenna integrated into the cellular antenna.

FIG. 11 is a perspective view of a portion of the cellular antenna 200 in accordance with an exemplary embodiment showing an integrated Wi-Fi open slot antenna 220 integrated into the cellular antenna 200. The integrated Wi-Fi antenna 220 defines one of the Wi-Fi antennas 206 of the antenna assembly 100. The integrated Wi-Fi antenna 220 provides the Wi-Fi antenna without needing an additional structure mounted to the antenna base, thus providing an additional antenna element without occupying additional real estate/footprint on the antenna base. The addition of the integrated Wi-Fi antenna 220 integrated into the cellular antenna 200 saves cost and manufacturing processes to reduce the overall cost of the antenna assembly. In an exemplary embodiment, a separate feed cable (not shown) may be coupled to the integrated Wi-Fi antenna 220 to operate the integrated Wi-Fi antenna 220.

The open slot integrated Wi-Fi antenna 220 is integrated into the upper portion 308 of the cellular antenna 200. The upper portion 308 includes an opening or slot 380 that separates the upper portion 308 into a first branch 382 and a second branch 384 on opposite sides of the slot 380. The slot 380 is used to excite the additional resonance to the cellular antenna 200. The positioning and shape of the slot 380 as well as position of the feeding 220 controls the characteristics of the integrated Wi-Fi antenna 220. For example, the width and position of the slot 380 may be configured the integrated Wi-Fi antenna 220 by controlling the positioning of the first branch 382 relative to the second branch 384. The shape of the slot 380 defines the shape of the connecting portion 386 between the first branch 382 and the second branch 384, which controls the characteristics of the integrated Wi-Fi antenna 220. The positioning of the slot 380 controls the shape of the first branch 382 and the shape of the second branch 384. For example, in the illustrated embodiment, the slot 380 is located near the top of the upper portion 308 such that the second branch 384 is narrower relative to the first branch 382. Providing the slot 380 near the top of the top loaded structure reduces mutual coupling of the integrated Wi-Fi antenna 220 toward a particular operating frequency. The slot 380 may be located at other positions in alternative embodiments, such that the branches 382, 384 have similar widths or such that the second branch 384 is wider relative to the first branch 382. In the illustrated embodiment, the slot 380 is open at the top edge 362 and extends along the extension portion 370 and the secondary portion 372. However, in alternative embodiments, the slot 380 may be open at other locations, such as at the front edge of the secondary portion 372 or at the main body 346. The cellular antenna 200 may include multiple slots 380 in alternative embodiments to form multiple integrated Wi-Fi antennas 220, which may be operable at different frequencies.

Figure 12:
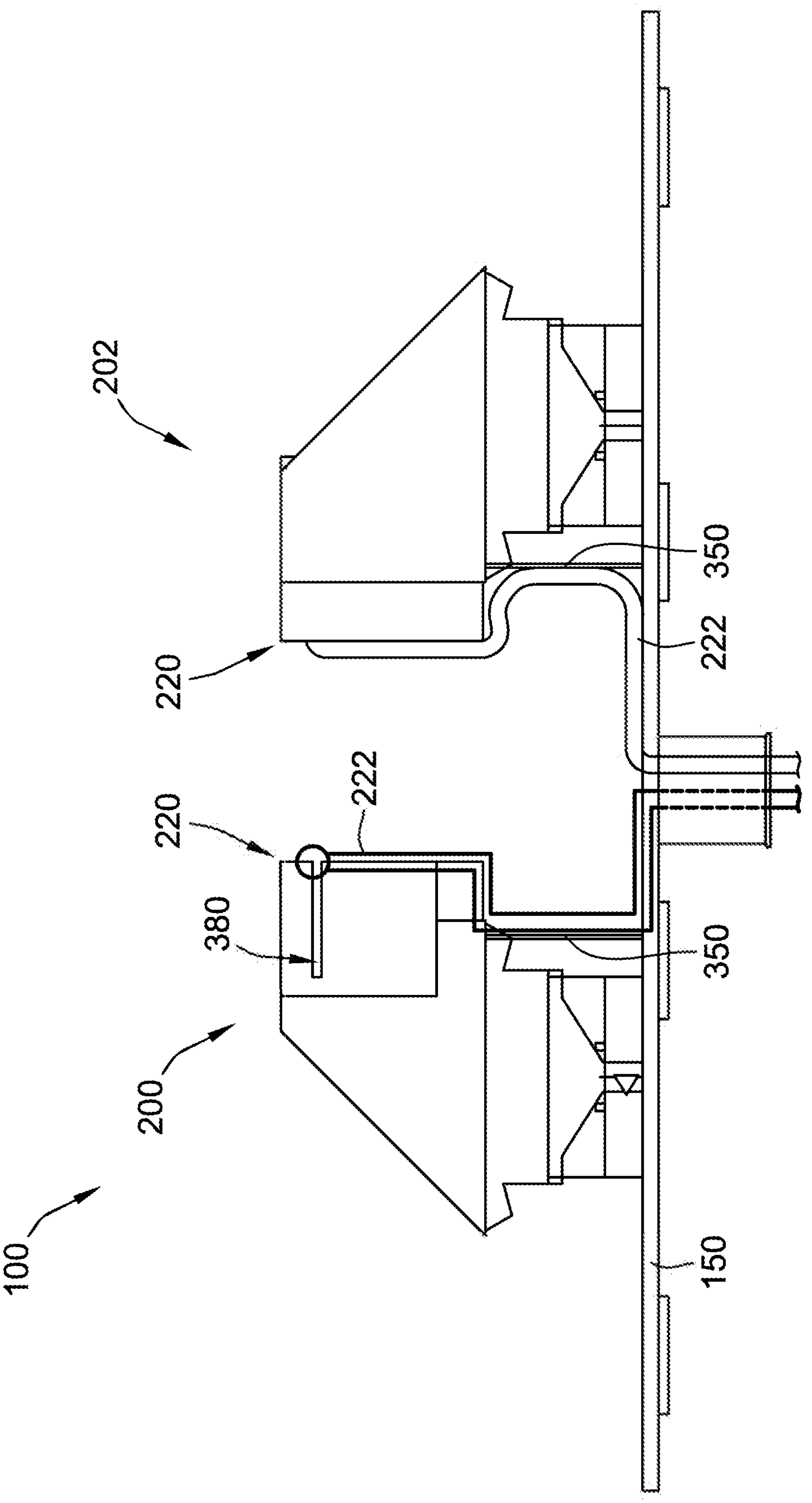
FIG. 12 is a side view of a portion of the antenna assembly showing the first and second cellular antennas in accordance with an exemplary embodiment each including integrated Wi-Fi antennas.

FIG. 12 is a side view of a portion of the antenna assembly 100 showing the first and second cellular antennas 200, 202 in accordance with an exemplary embodiment each including integrated Wi-Fi open slot antennas 220. FIG. 12 illustrates feed cables 222 feeding the integrated Wi-Fi antennas 220. In the illustrated embodiment, two feed cables are shown connected to each antenna structure to control operation of the cellular antenna 200 or 202 and the Wi-Fi antenna 220 integrated into the cellular antenna 200 or 202. The feed cables 222 are routed through the substrate 150 to the integrated Wi-Fi antennas 220. In an exemplary embodiment, the feed cables 222 are routed along the cellular antennas 200, 202 to the upper portions of the cellular antennas 200, 202. The feed cable 222 may be fed to a specific location of the opening or slot 380 to match the antenna to a particular frequency band (for example, 2.4-2.5 GHZ, 4.9-6 GHz, and/or 6-7.125 GHz). In an exemplary embodiment, the feed cable 222 is routed along the shorting leg 350 to the upper portion. The shorting leg 350 provide mechanical connection point for the feed cable 222. The feed cable 222 can be routed along the shorting leg 350 to avoid irregularity of performance by as the shorting leg 350 is a shorting ground has low impedance.

Figure 13:
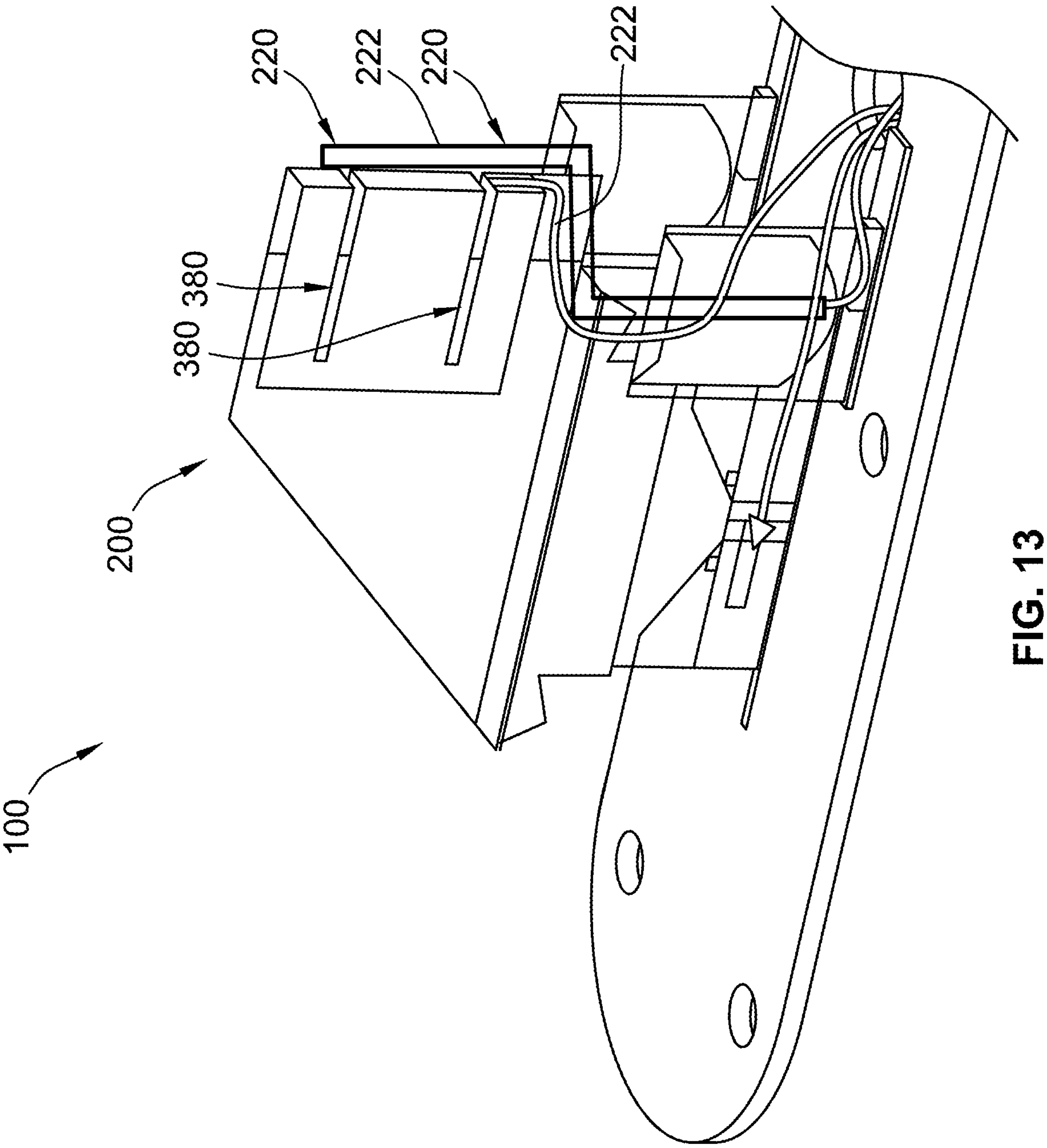
FIG. 13 is a perspective view of a portion of the antenna assembly showing the first cellular antenna in accordance with an exemplary embodiment including integrated two Wi-Fi antennas.

FIG. 13 is a perspective view of a portion of the antenna assembly 100 showing the first cellular antenna 200 in accordance with an exemplary embodiment. In the illustrated embodiment, the first cellular antenna 200 includes multiple slots 380 defining multiple integrated Wi-Fi open slot antennas 220 in the same cellular antenna 200. Different feed cables 222 are connected to the different slots 380 for operating the different integrated Wi-Fi antennas 220. In the illustrated embodiment, three feed cables are shown connected to the same antenna structure.

Figure 14:
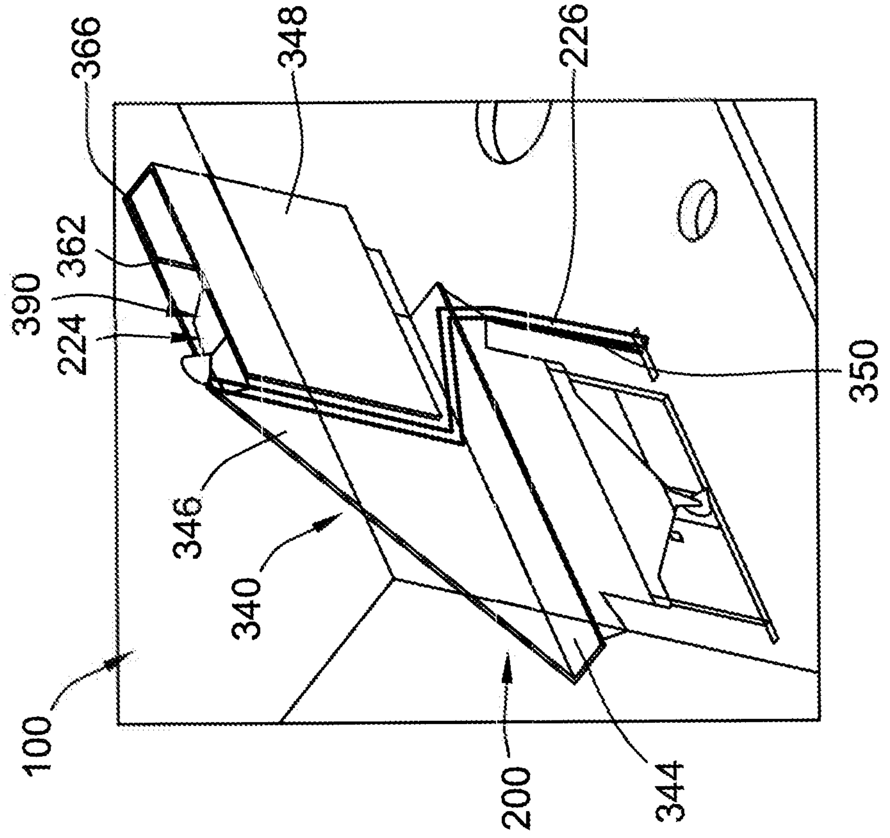
FIG. 14 is a perspective view of a portion of the antenna assembly showing the first cellular antenna in accordance with an exemplary embodiment including integrated top fed Wi-Fi antenna.

FIG. 14 is a perspective view of a portion of the antenna assembly 100 showing the first cellular antenna 200 in accordance with an exemplary embodiment. In the illustrated embodiment, the first cellular antenna 200 includes an opening 390 in the main body 346 defining a patch integrated Wi-Fi antenna 224 in the cellular antenna 200. The patch integrated Wi-Fi antenna 224 may function as a Patch Inverted-F antenna (PIFA). The feeding patch 390 is configured with the tapering profile to achieve wideband coverage, such as covering frequencies between 2.4-2.5 GHz and 4.9-7.125 GHz. A feed cable 226 is connected to the main body 346 at the feeding patch 390 for operating the integrated Wi-Fi antenna 224. The feeding cable 226 is routed along the radiating element 340, such as along the shorting leg 350, the extensions segment 344 and the main body 346 to a location at the top edge 362. The wrapped segment 348 extends from the rear side edge 366 in the illustrated embodiment.

Figure 15:
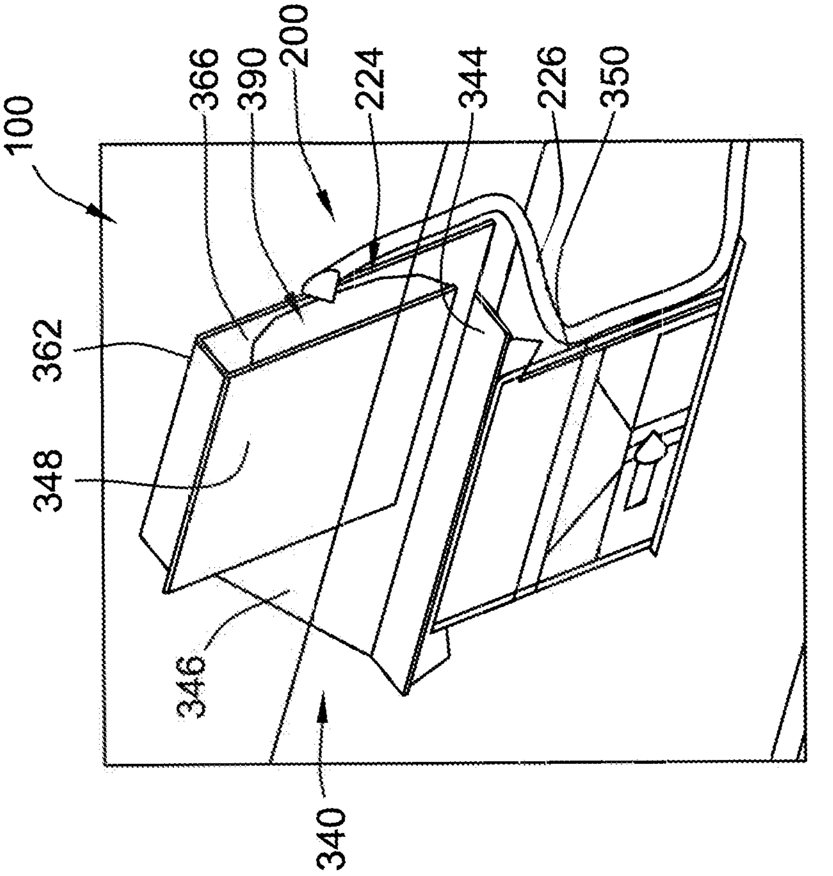
FIG. 15 is a perspective view of a portion of the antenna assembly showing the first cellular antenna in accordance with an exemplary embodiment including integrated side fed Wi-Fi antenna.

FIG. 15 is a perspective view of a portion of the antenna assembly 100 showing the first cellular antenna 200 in accordance with an exemplary embodiment. In the illustrated embodiment, the first cellular antenna 200 includes the opening 390 in the main body 346 defining the patch integrated Wi-Fi antenna 224 in the cellular antenna 200. The patch integrated Wi-Fi antenna 224 may function as a Patch Inverted-F antenna (PIFA). The feeding patch 390 is configured with the tapering profile to achieve wideband coverage, such as covering frequencies between 2.4-2.5 GHz and 4.9-7.125 GHz. The feed cable 226 is connected to the main body 346 at the opening 390 for operating the integrated Wi-Fi antenna 224. The feed cable 226 is routed along the radiating element 340, such as along the shorting leg 350, the extensions segment 344 and the main body 346 to a location at the side edge 366. The wrapped segment 348 extends from the top edge 362 in the illustrated embodiment.

Figure 16:
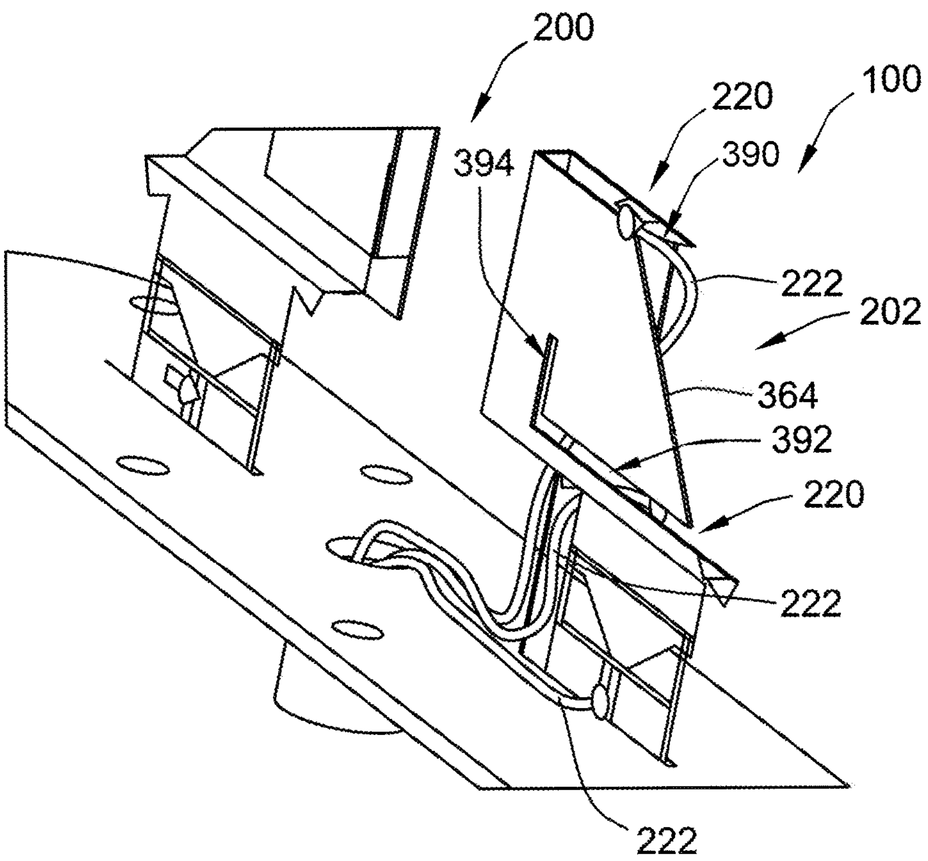
FIG. 16 is a side view of a portion of the antenna assembly showing the first and second cellular antennas in accordance with an exemplary embodiment each including multiple integrated Wi-Fi antennas.

FIG. 16 is a side view of a portion of the antenna assembly 100 showing the first and second cellular antennas 200, 202 in accordance with an exemplary embodiment each including multiple integrated Wi-Fi antennas 220. FIG. 16 illustrates a first slot 392 and a second slot 394 defining different branches that function as the first integrated Wi-Fi open slot antenna 220. In the illustrated embodiment, the first slot 392 is open at the side edge 364 and the second slot 394 is open to the first slot 392. The second slot 394 extends perpendicular from the first slot 392 to enable sufficient length for the slot antenna to resonates at a target frequency, such as at a frequency of approximately 2.4 GHz. For example, the first slot 392 extend horizontally and the second slot 394 extends vertically. Other orientations are possible in alternative embodiments. Second integrated WI-FI PIFA antenna 220 with its tapering feeding patch shown in FIG. 16. In the illustrated embodiment, the feeding cables 222 fed to the integrated Wi-Fi open slot antenna 220 and PIFA antenna 220.

Figure 17:
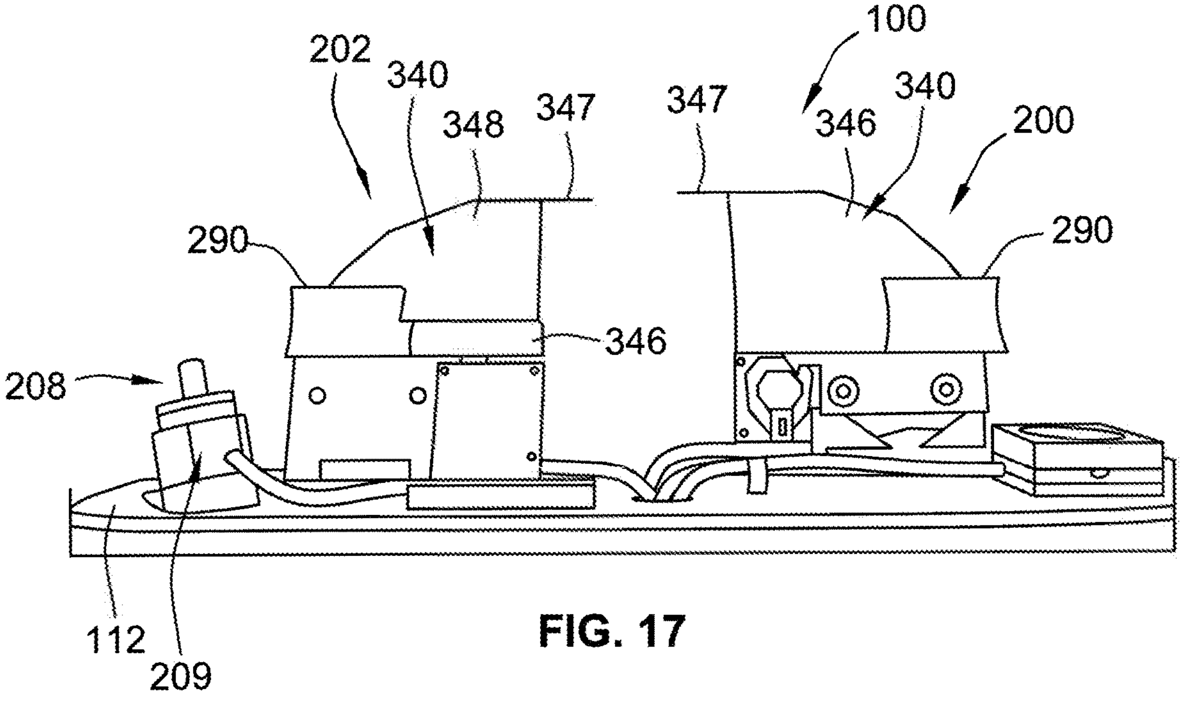
FIG. 17 is a side view of a portion of the antenna assembly in accordance with an exemplary embodiment.

FIG. 17 is a side view of a portion of the antenna assembly 100 in accordance with an exemplary embodiment. In an exemplary embodiment, foam spacers 290 are coupled to the first and second cellular antennas 200, 202 to position the cellular antennas 200, 202 relative to the radome 114 (not shown). The foam spacers 290 are compressible to provide a forgiving interface between the cellular antennas 200, 202 and the radome 114, such as to accommodate vibration or shock to prevent damage to the cellular antennas 200, 202.

In the illustrated embodiment, the cellular antennas 200, 202 includes stubs 347 extending from the main body 346 and/or the wrap segment 348. The stubs 347 extend the length of the radiating elements 340 to help matching, such as at the lowest frequency of 617 MHz. Optionally, each cellular antenna 200, 202 may include multiple stubs 347 extending from different portions of the radiating elements 340.

In the illustrated embodiment, a stud connector 209 for the whip antenna 208 is shown mounted to the antenna base 112. The whip antenna 208, which is configured to be exterior of the radome 114, may be threadably coupled to the stud connector 209 from the exterior of the radome 114. The stud connector 209 is connected to the corresponding feeding cable.

Figure 18:
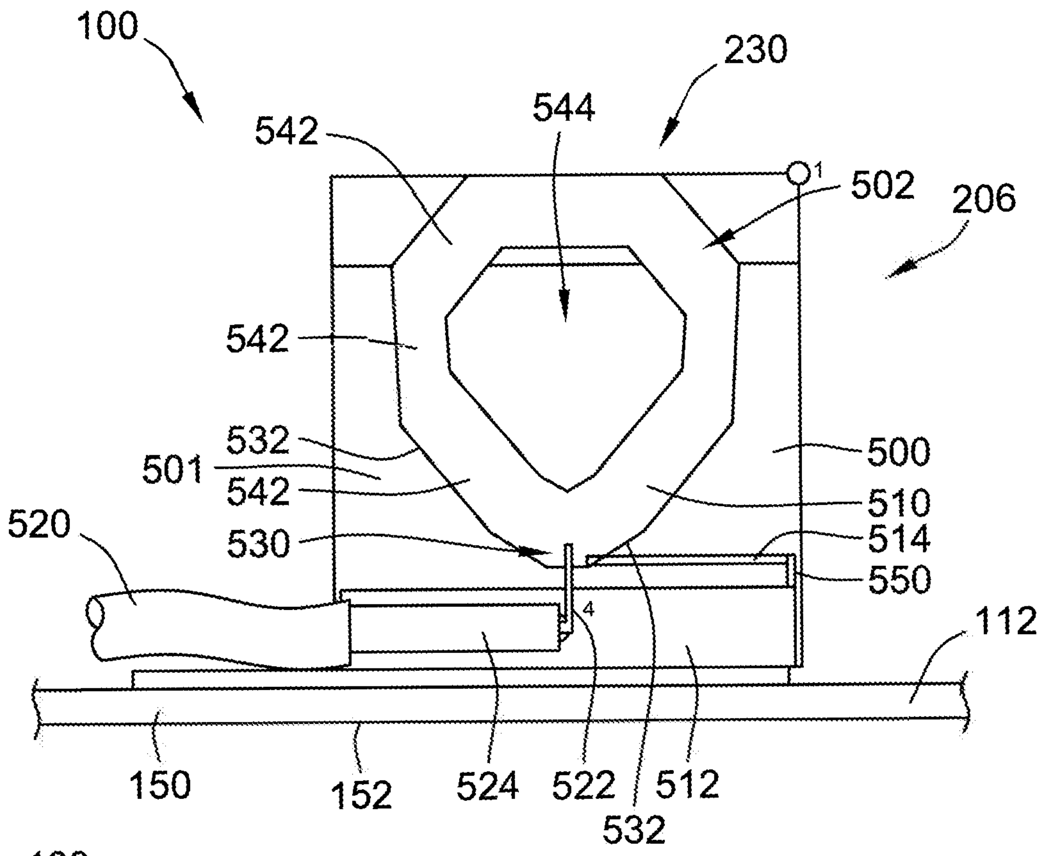
FIG. 18 is a side view of a portion of the antenna assembly showing the Wi-Fi antenna in accordance with an exemplary embodiment.

FIG. 18 is a side view of a portion of the antenna assembly 100 showing the Wi-Fi shorted monopole antenna 206 in accordance with an exemplary embodiment. The Wi-Fi antenna 206 is illustrated as a standalone Wi-Fi antenna 230 that can be configured to operate at the frequency range from 2.4 GHz-7.125 GHZ. The standalone Wi-Fi antenna 230 is configured to be mounted to the antenna base 112 separate from the cellular antennas 200, 202, which is in contrast to the integrated Wi-Fi antennas 220 (shown in FIG. 11) that are integrated with the cellular antennas 200, 202.

The Wi-Fi antenna 206 includes a dielectric support 500 and an antenna element 502 coupled to the dielectric support 500. In an exemplary embodiment, the dielectric support 500 includes a circuit board 501 and the antenna element 502 is defined by one or more circuits formed on the circuit board 501. However, in alternative embodiments, the antenna element 502 may be a stamped and formed part and the dielectric support 500 may be a formed dielectric part or an overmolded part that is devoid of circuits or conductors but rather is only used for mechanical support of the antenna element 502. In other various embodiments, the stamped and formed antenna element may be provided without the dielectric support altogether.

The dielectric support 500 supports the antenna element 502 relative to the substrate 150. The dielectric support 500 provides a mounting interface to the circuit substrate 150. In the illustrated embodiment, the dielectric support 500 is rectangular in shape with a bottom edge of the dielectric support 500 resting on the substrate 150. However, the dielectric support 500 may have other shapes in alternative embodiments. In various embodiments, the dielectric support is oriented vertically, such as perpendicular to the substrate 150. In an exemplary embodiment, the antenna element 502 is isolated from the ground plane 152, such as by the dielectric support 500. For example, the dielectric support 500 may hold the antenna element 502 at a suspended or elevated position relative to the substrate 150 and the ground plane 152.

In an exemplary embodiment, the circuit board 501 includes a feed circuit 510, a ground circuit 512, and a shorting circuit 514 defining a shorting leg 550 to the ground circuit 512 and/or the ground plane 152. The circuit board 501 may include additional circuits in various embodiments. The circuits are traces, vias or other types of conductors of the circuit board 501.

In an exemplary embodiment, a feeding cable 520 is electrically connected to the feed portion. For example, the feed cable 520 is electrically connected to the feed circuit 510 with and the ground circuit 512. In an exemplary embodiment, a center conductor 522 of the feeding cable 520 is connected to the feed circuit 510, such as being soldered to the feed circuit 510. A cable shield 524 of the feed cable 520 is connected to the ground circuit 512, such as being soldered to the ground circuit 512. The ground circuit 512 may be electrically connected to the ground plane 152 of the substrate 150. The shorting path defined by the shorting circuit 514 is electrically connected to the ground circuit 512 and/or the ground plane 152. In the illustrated embodiment, the ground circuit 512 is located near the bottom edge of the circuit board 501. The ground circuit 512 may be oriented vertically. In the illustrated embodiment, the feed cable 520 is connected to the feed circuit 510 and the ground circuit 512 near a central location of the circuit board 501, such as approximately centered between a front edge and a rear edge of the circuit board 501. Other locations are possible in alternative embodiments.

In an exemplary embodiment, the feed circuit 510 emanates from the central location of the circuit board 501. For example, the feed circuit 510 may have a feed point 530 approximately centered between the front edge and the rear edge of the circuit board 501. The center conductor 522 is connected to the feed circuit 510 at the feed point 530. In an exemplary embodiment, the circuit board 501 has a masking layer at the feed point 530 masking the center conductor 522 from the ground circuit 512. The feed circuit 510 includes steps 532 extending outward from the feed point 530 toward the front and rear edges of the circuit board 501. Optionally, the steps 532 may have slanted edges along portions of the steps 532. The slanted edges along the multiple steps 532 may offer flexibility for optimization for wide bandwidth. The shorting circuit 514 may be a long thin circuit path that provides a shorting path between the monopole radiating element and the ground, such as the ground circuit 512 and/or the ground plane 152. The shorting circuit 514 may enhance matching of the monopole radiating element as well as offers ESD protection as a shorted antenna. The shorting line 514 may be low and thin to prevent obstruction toward the radiator to minimize the impact on the radiation pattern.

In an exemplary embodiment, the radiating element of the Wi-Fi antenna 206 includes a plurality of segments 542 surrounding a hollow portion 544. The segments 542 may be angled relative to each other at various angles to create the steps 532. The edges of the segments 542 are slanted to create both height and width for the radiating element. The size and shape of the hollow portion 544 may control the characteristics of the radiating element, such as to control operation at a target frequency range. However, in alternative embodiments, the radiating element may be filled in (side-to-side and top to bottom) rather than being hollow.

Figure 19:
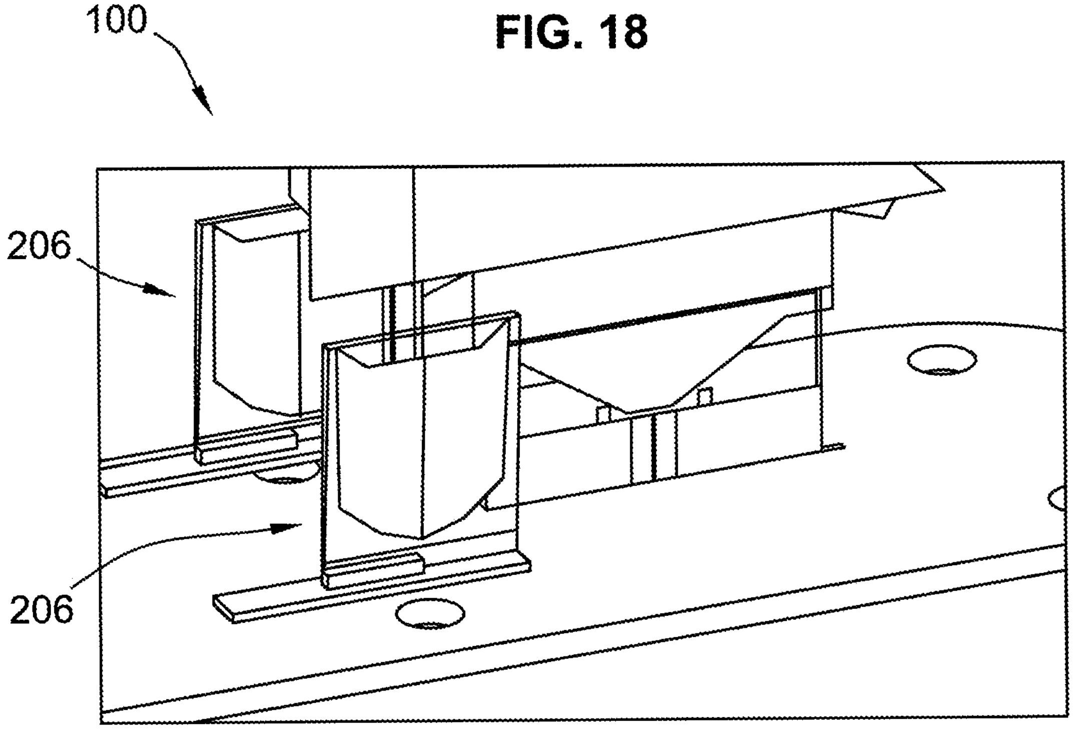
FIG. 19 is a perspective view of a portion of the antenna assembly showing a plurality of the standalone Wi-Fi antenna in accordance with an exemplary embodiment.

FIG. 19 is a perspective view of a portion of the antenna assembly 100 showing a plurality of the standalone Wi-Fi antenna 206 in accordance with an exemplary embodiment. In the illustrated embodiment, the standalone Wi-Fi antennas 206 are filled in rather than being hollow.

Figure 20:
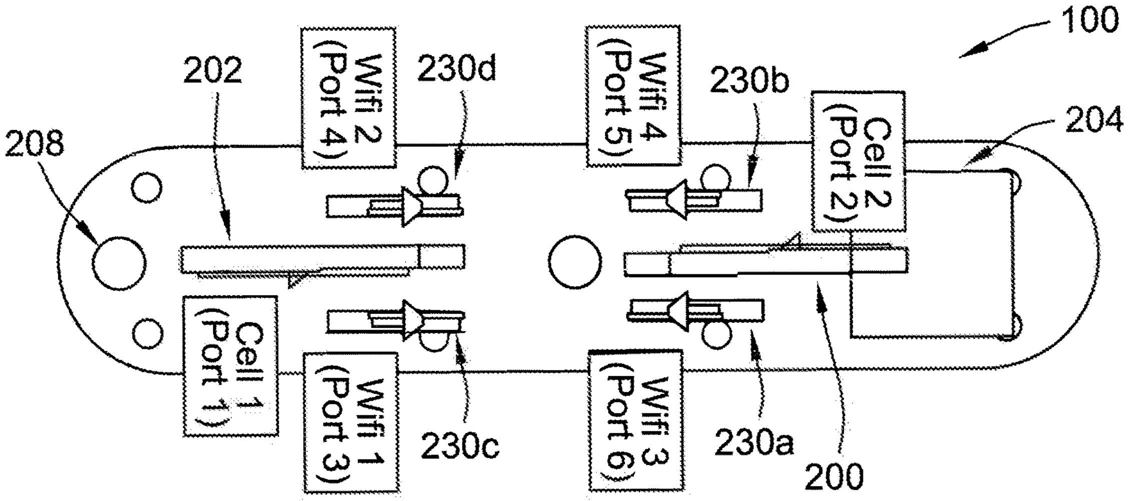
FIG. 20 is a top view of a portion of the antenna assembly illustrating components of the antenna assembly in a first antenna arrangement in accordance with an exemplary embodiment.

FIG. 20 is a top view of a portion of the antenna assembly 100 illustrating components of the antenna assembly 100 in a first antenna arrangement. In the illustrated embodiment, the antenna assembly 100 includes the first cellular antenna 200 configured to be operable over one or more cellular frequencies, the second cellular antenna 202 configured to be operable over one or more cellular frequencies, the satellite antenna 204 configured to be operable over one or more satellite frequencies, four of the standalone Wi-Fi antennas 230 configured to be operable over one or more Wi-Fi frequencies, and the whip antenna 208 configured to be operable over terrestrial frequencies. Two of the standalone Wi-Fi antennas 230*a*, 230*b* are arranged on opposite right and left sides of the first cellular antenna 200 and two of the standalone Wi-Fi antennas 230*c*, 230*d* are arranged on opposite right and left sides of the second cellular antenna 202. Other arrangements are possible in alternative embodiments.

Figure 21:
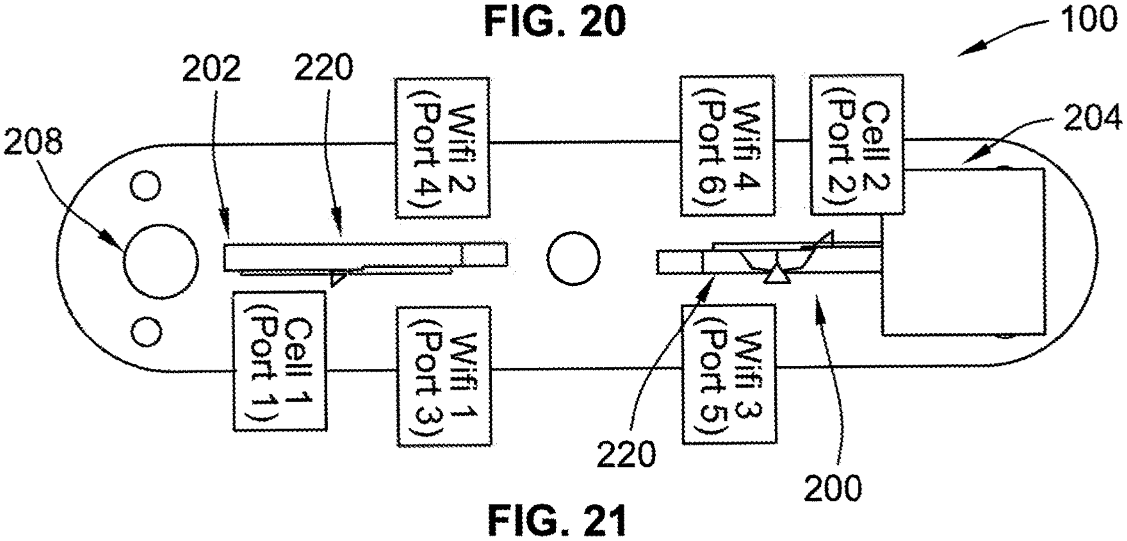
FIG. 21 is a top view of a portion of the antenna assembly illustrating components of the antenna assembly in a first antenna arrangement in accordance with an exemplary embodiment.

FIG. 21 is a top view of a portion of the antenna assembly 100 illustrating components of the antenna assembly 100 in a first antenna arrangement. In the illustrated embodiment, the antenna assembly 100 includes the first cellular antenna 200 configured to be operable over one or more cellular frequencies, the second cellular antenna 202 configured to be operable over one or more cellular frequencies, the satellite antenna 204 configured to be operable over one or more satellite frequencies, four of the integrated Wi-Fi antennas 220 configured to be operable over one or more Wi-Fi frequencies, and the whip antenna 208 configured to be operable over terrestrial frequencies. Other arrangements are possible in alternative embodiments.

Figure 22:
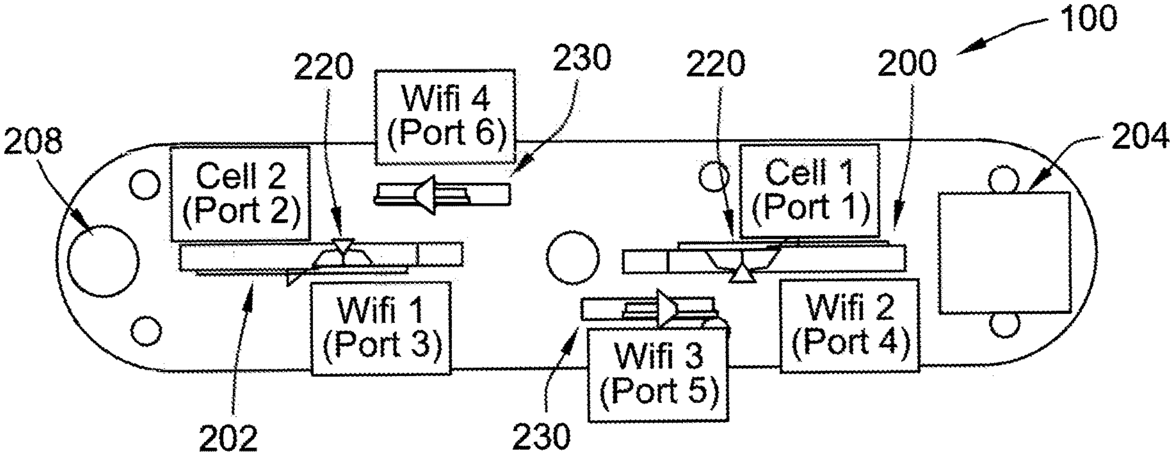
FIG. 22 is a top view of a portion of the antenna assembly illustrating components of the antenna assembly in a first antenna arrangement in accordance with an exemplary embodiment.

FIG. 22 is a top view of a portion of the antenna assembly 100 illustrating components of the antenna assembly 100 in a first antenna arrangement. In the illustrated embodiment, the antenna assembly 100 includes the first cellular antenna 200 configured to be operable over one or more cellular frequencies, the second cellular antenna 202 configured to be operable over one or more cellular frequencies, the satellite antenna 204 configured to be operable over one or more satellite frequencies, two of the standalone Wi-Fi antennas 230 configured to be operable over one or more Wi-Fi frequencies, two of the integrated Wi-Fi antennas 220 integrated with the cellular antennas 200, 202 configured to be operable over one or more Wi-Fi frequencies, and the whip antenna 208 configured to be operable over terrestrial frequencies. Other arrangements are possible in alternative embodiments, such as having two additional standalone Wi-Fi antennas 230 and/or two additional integrated Wi-Fi antennas 220.

Figure 23:
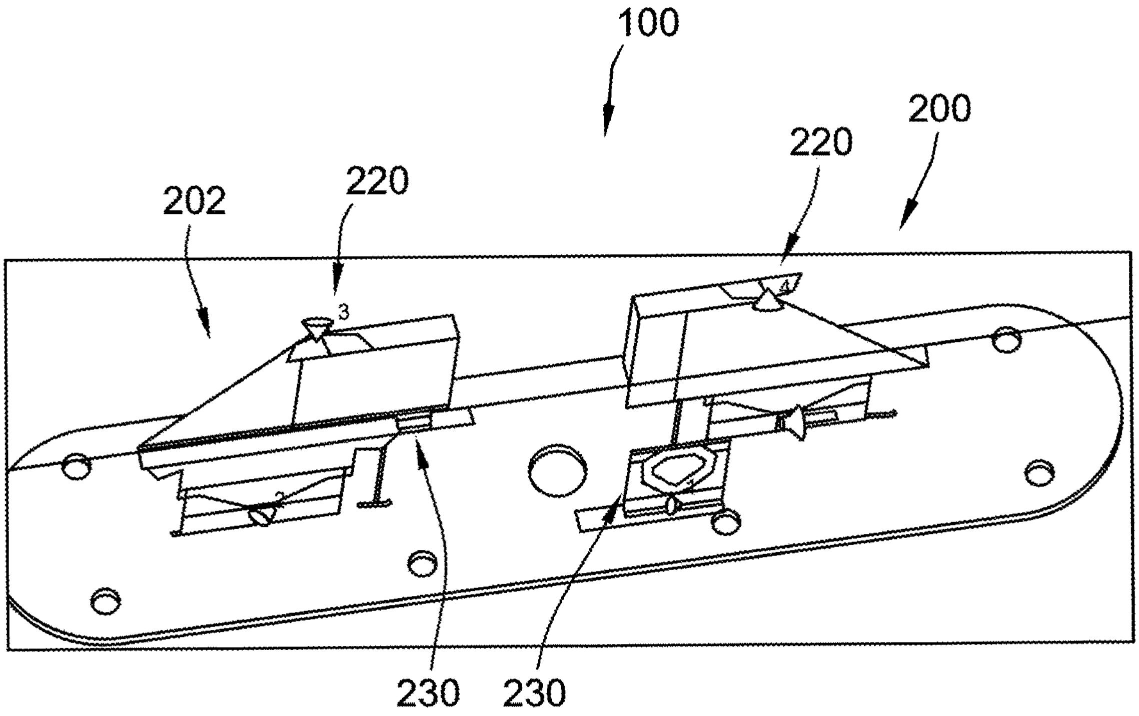
FIG. 23 is a perspective view of a portion of the antenna assembly in accordance with an exemplary embodiment.
Figure 24:
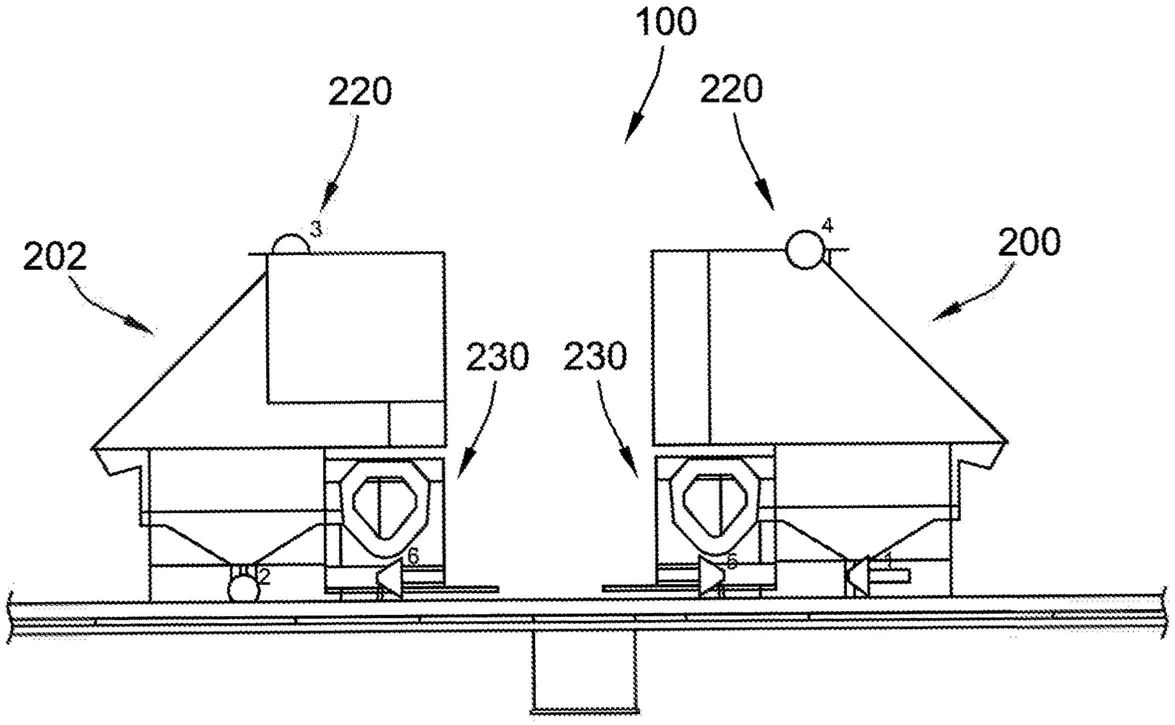
FIG. 24 is a side view of a portion of the antenna assembly in accordance with an exemplary embodiment.

FIG. 23 is a perspective view of a portion of the antenna assembly 100 in accordance with an exemplary embodiment. FIG. 24 is a side view of a portion of the antenna assembly 100 in accordance with an exemplary embodiment. FIGS. 23 and 24 illustrate the antenna arrangement as shown in FIG. 22 including the first cellular antenna 200, the second cellular antenna 202, two of the standalone Wi-Fi antennas 230, and two of the integrated Wi-Fi antennas 220 integrated with the cellular antennas 200, 202 (the satellite and whip antennas are not illustrated in FIGS. 23-24).

In an exemplary embodiment, the antenna elements are arranged relative to each other to attempt to minimize mutual coupling or diminish negative effects on each other. The lower mutual coupling will improve the MIMO effectively. For example, the antenna elements are spaced apart from each other as much as practical to reduce mutual coupling. Unlike the arrangement with the standalone Wi-Fi antennas 230*c* and 230*d* (FIG. 20), which may have high mutual coupling as the antenna elements are arrange very close to each other at the same height, the antenna arrangement shown in FIG. 23, includes the standalone Wi-Fi antennas 230 arrange spaced more apart. For example, the feed points 240 may be longitudinally offset, laterally offset and vertically offset as the Wi-Fi PIFA antenna is integrated at the top of the cellular antenna 200, 202. The feed points 240 of the integrated Wi-Fi antennas 220 are at the top edges of the upper portions (see FIG. 14) or the feed point side portions (see FIG. 15) of the cellular antennas 200, 202 will provide the vertical separation towards any of the standalone Wi-Fi antennas 230.

In an exemplary embodiment, the cellular antennas 200, 202 are arranged in different directions. For example, the chamfered edges face in opposite directions. In various embodiments, the circuit boards are arranged on opposite sides (for example, right side versus left side). The extension segments may extend in different directions (for example, left side versus right side). The wrapped segments of the upper portions of the cellular antennas 200, 202 may be wrapped in different directions (for example, right side versus left side) and/or may extend from different edges (for example, top edge versus side edge).

Figure 25:
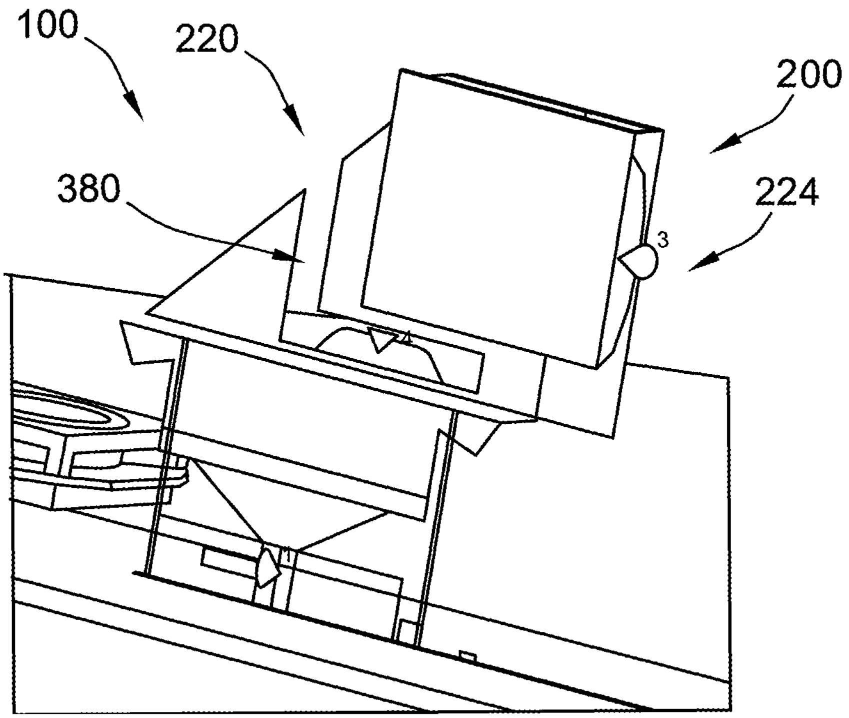
FIG. 25 is a perspective view of a portion of the antenna assembly showing the first cellular antenna in accordance with an exemplary embodiment.

FIG. 25 is a perspective view of a portion of the antenna assembly 100 showing the first cellular antenna 200 in accordance with an exemplary embodiment. In the illustrated embodiment, the first cellular antenna 200 includes a slotted integrated Wi-Fi antenna 220 and a patch integrated Wi-Fi antenna 224 in the same cellular antenna 200. The slot 380 of the slotted integrated Wi-Fi open slot antenna 220 extends from the chamfered edge and includes both a vertical slot and a horizontal slot. The patch integrated Wi-Fi antenna 224 includes a feed point along the rear edge. The feeding shape of the slots for the integrated Wi-Fi slot antenna 220 allows wideband characteristic instead of plain rectangular slot type.

Figure 26:
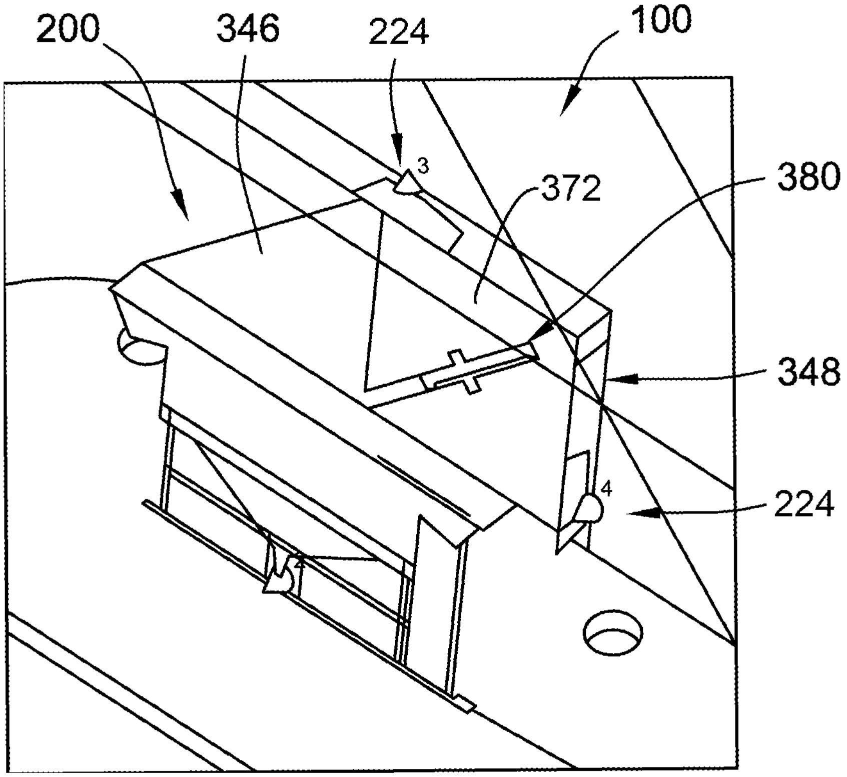
FIG. 26 is a perspective view of a portion of the antenna assembly showing the first cellular antenna in accordance with an exemplary embodiment.
Figure 27:
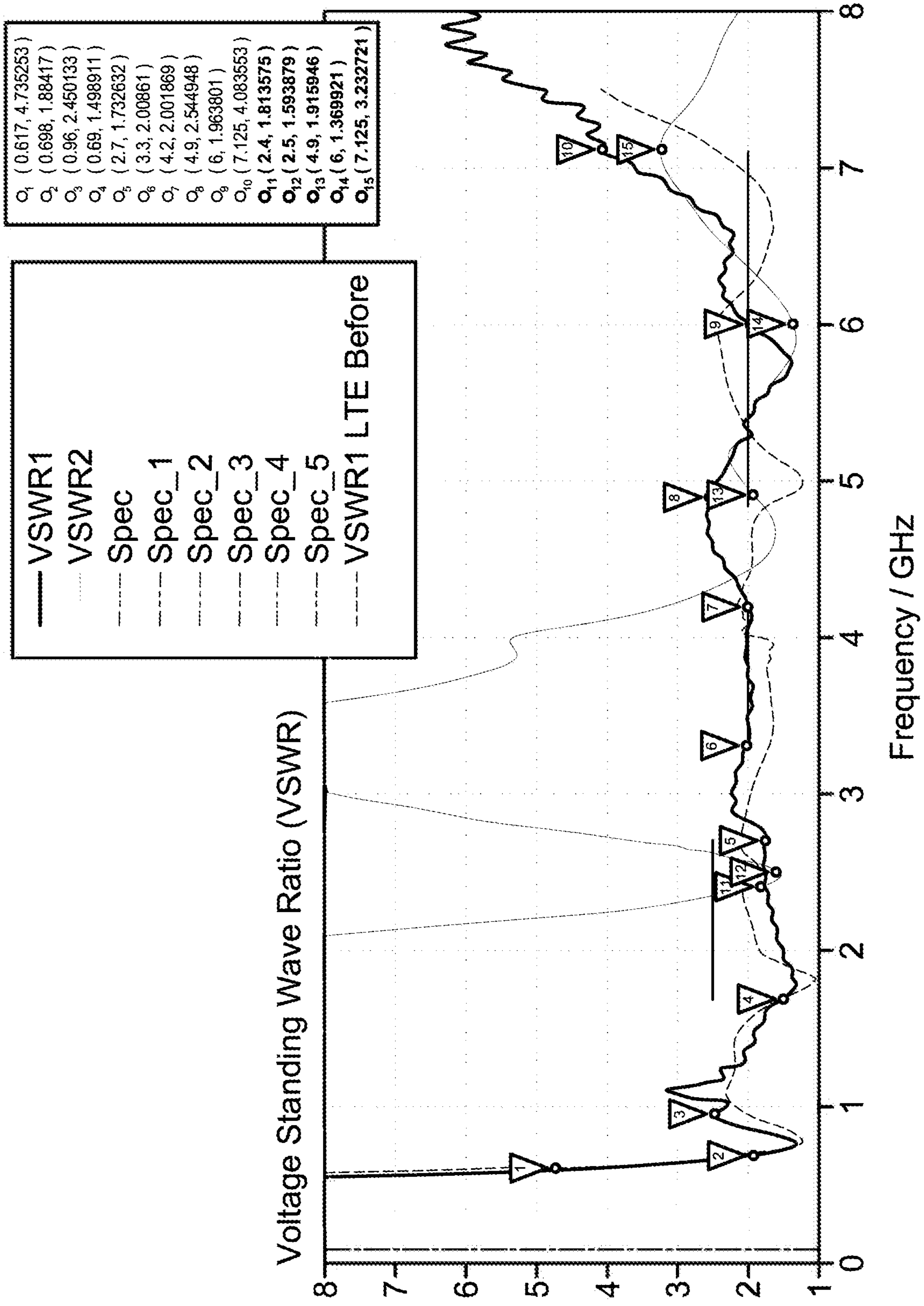
FIG. 27 illustrates analysis results measured for an exemplary antenna assembly having the antenna arrangement as shown in FIG. 22 in accordance with an exemplary embodiment.
Figure 28:
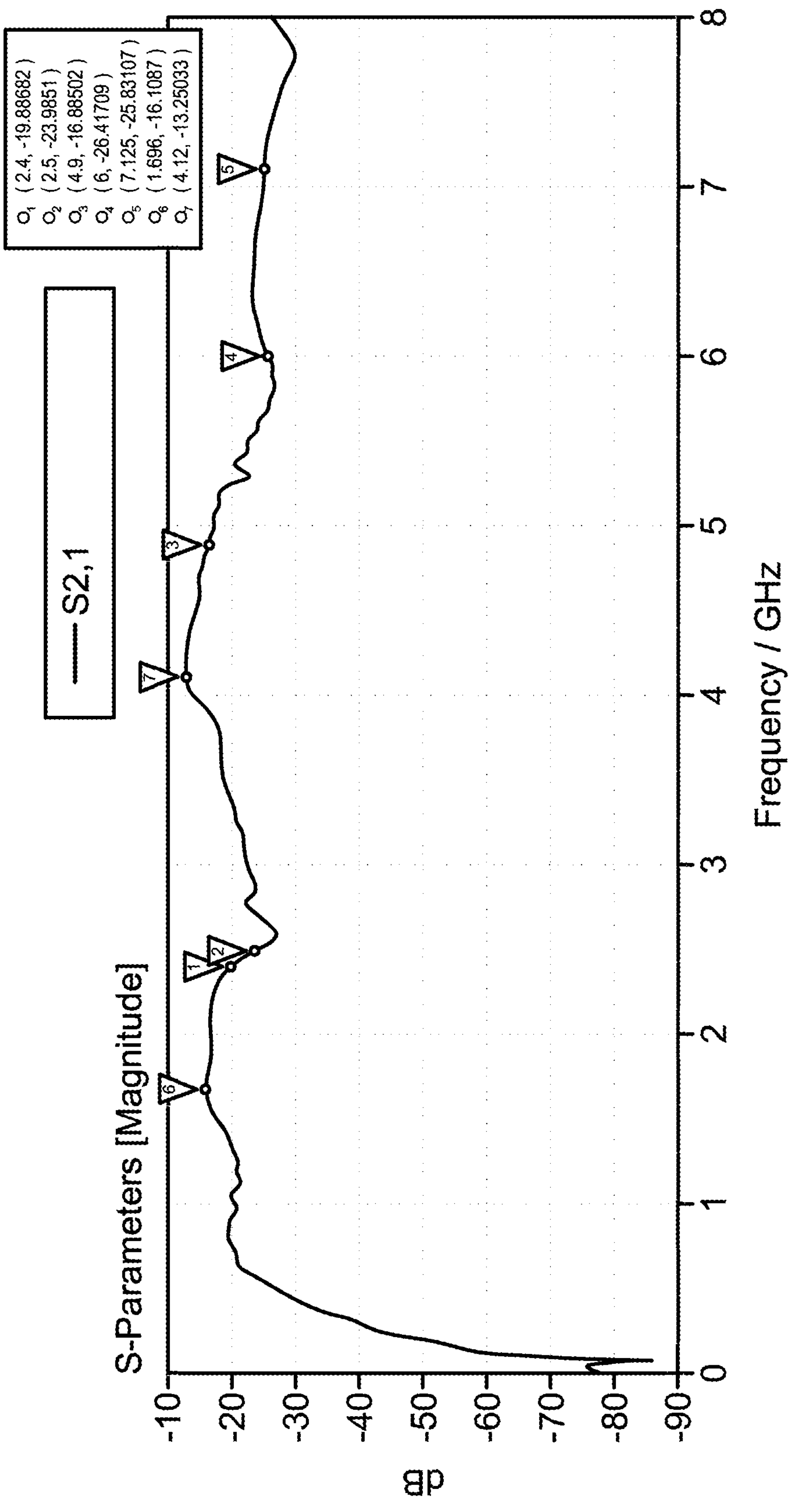
FIG. 28 illustrates analysis results measured for an exemplary antenna assembly having the antenna arrangement as shown in FIG. 22 in accordance with an exemplary embodiment.
Figure 29:
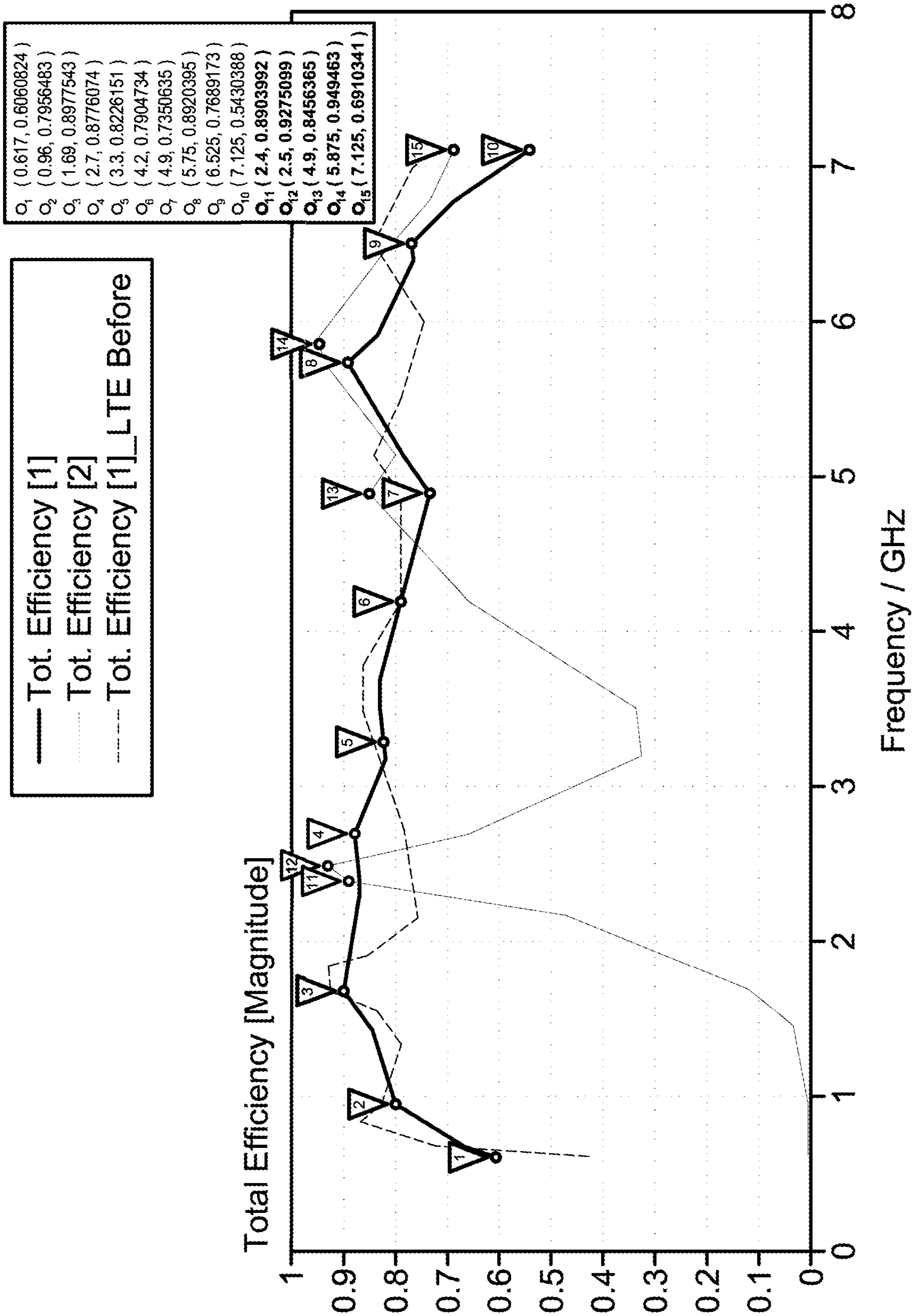
FIG. 29 illustrates analysis results measured for an exemplary antenna assembly having the antenna arrangement as shown in FIG. 22 in accordance with an exemplary embodiment.
Figure 30:
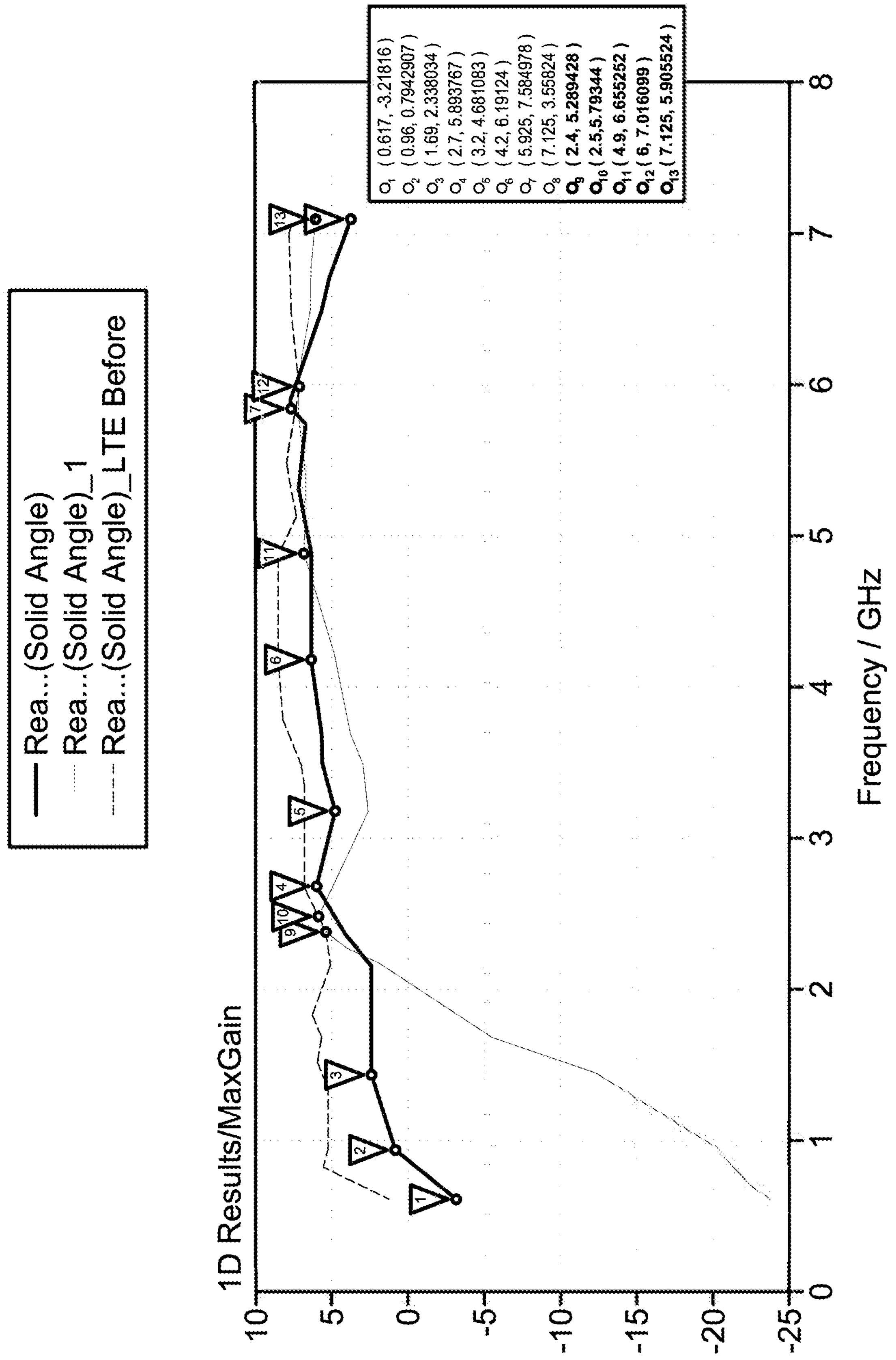
FIG. 30 illustrates analysis results measured for an exemplary antenna assembly having the antenna arrangement as shown in FIG. 22 in accordance with an exemplary embodiment.
Figures 1, 31A:
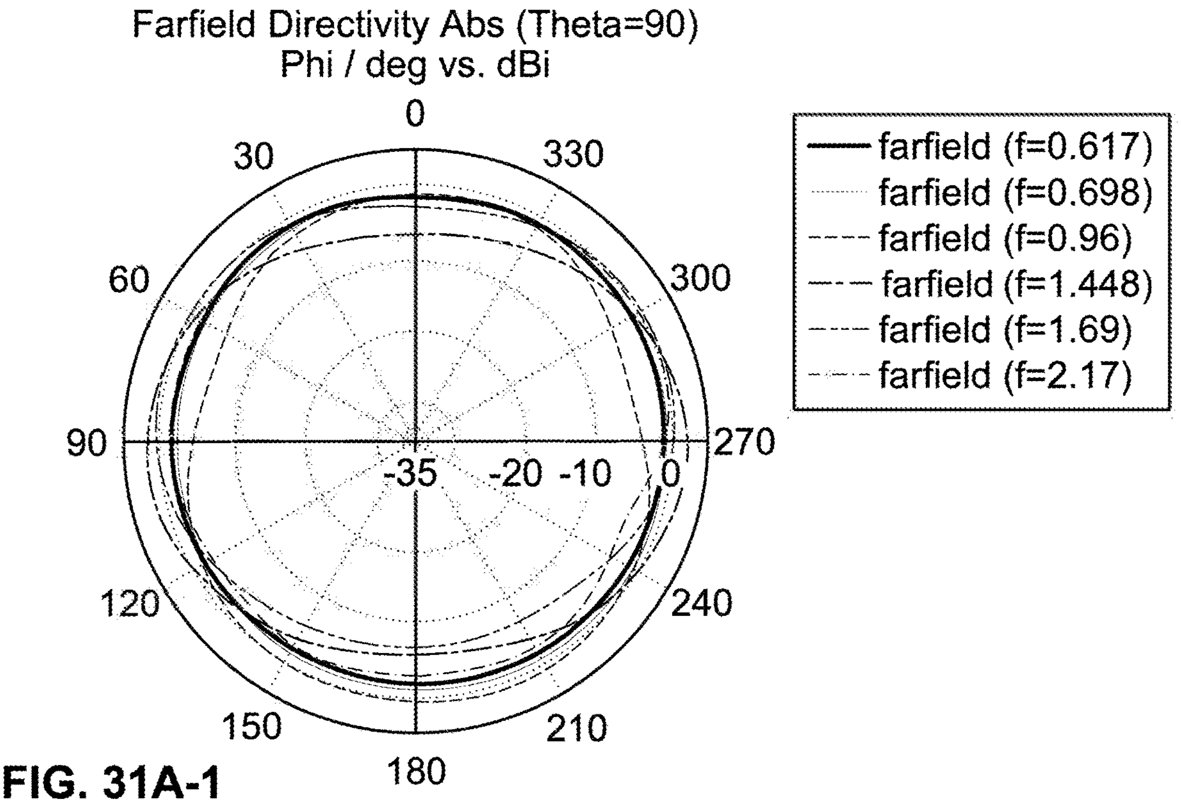
Figures 2, 31A:
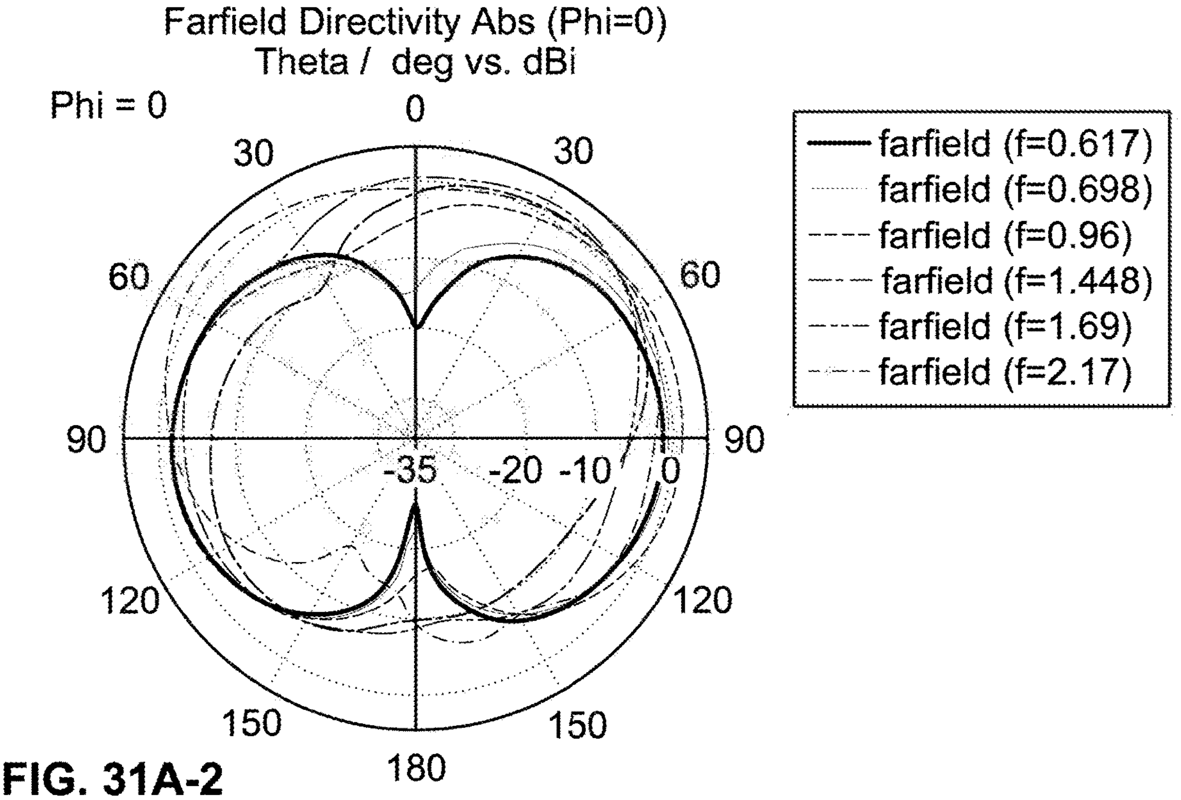
Figures 3, 31A:
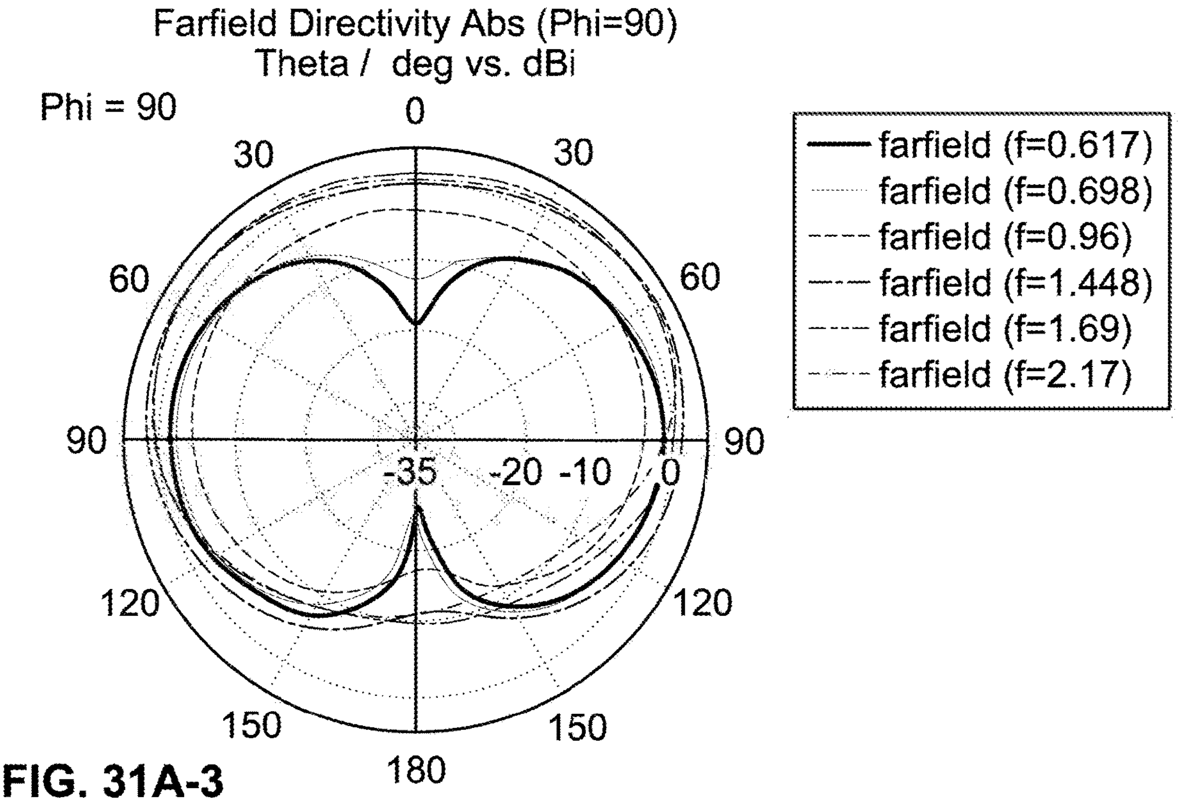
Figures 1, 31B:
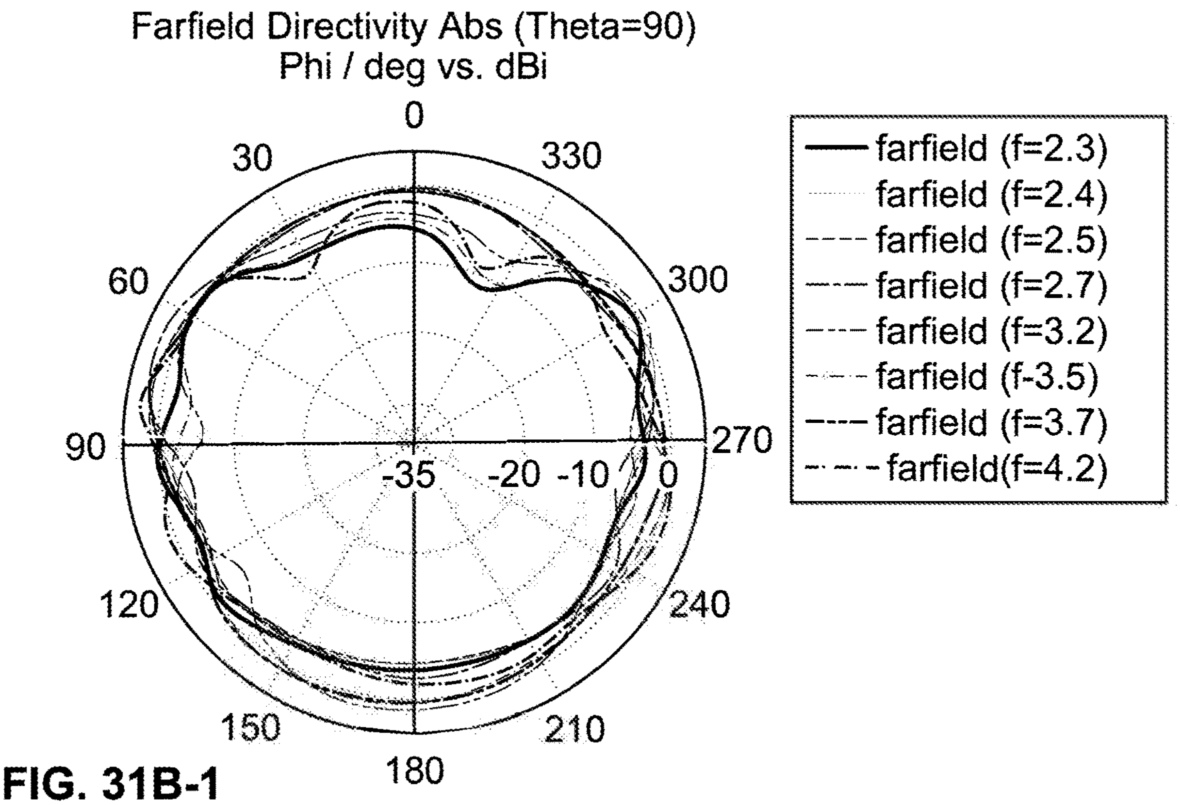
Figures 2, 31B:
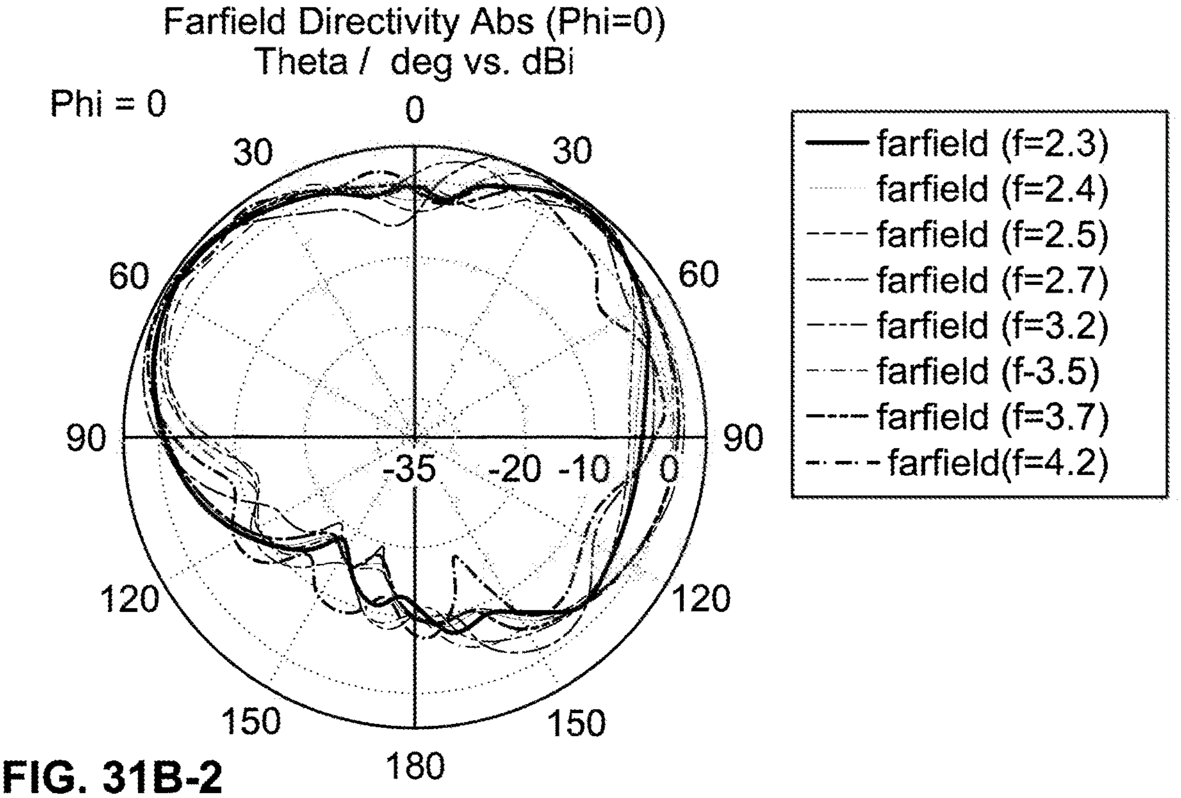
Figures 3, 31B:
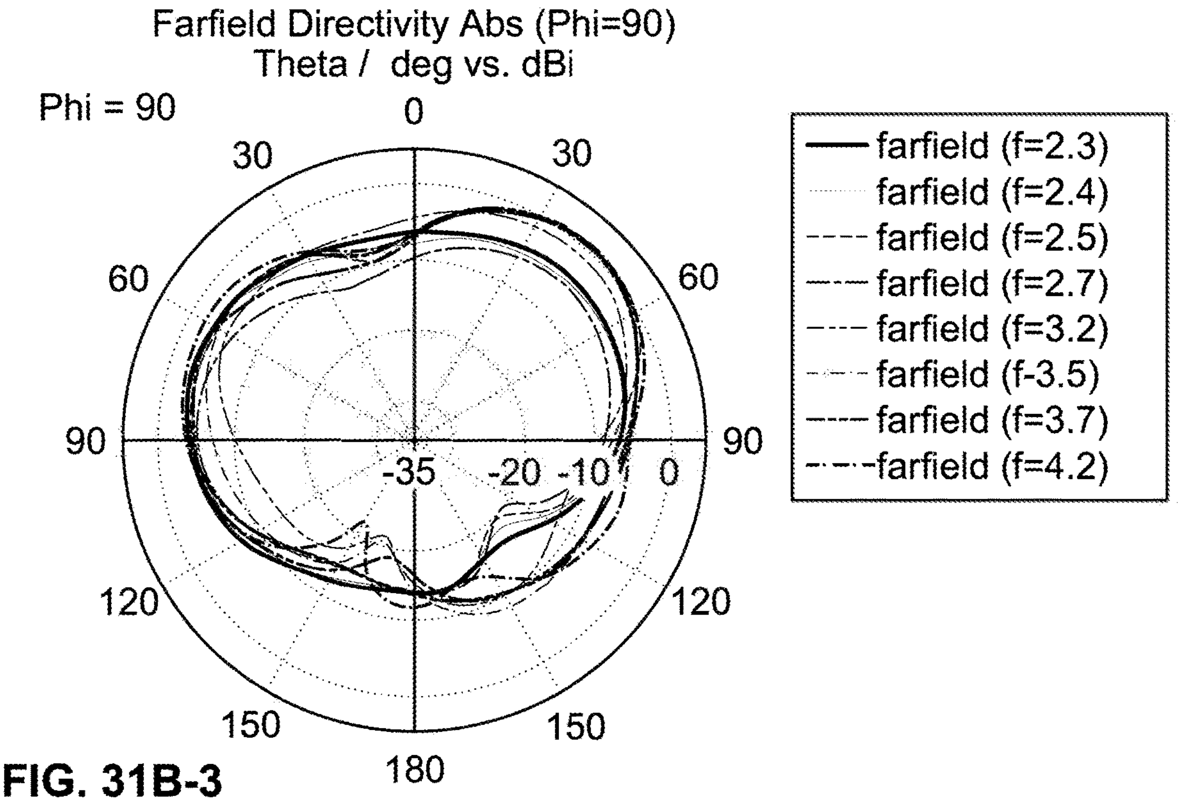
Figures 1, 31C:
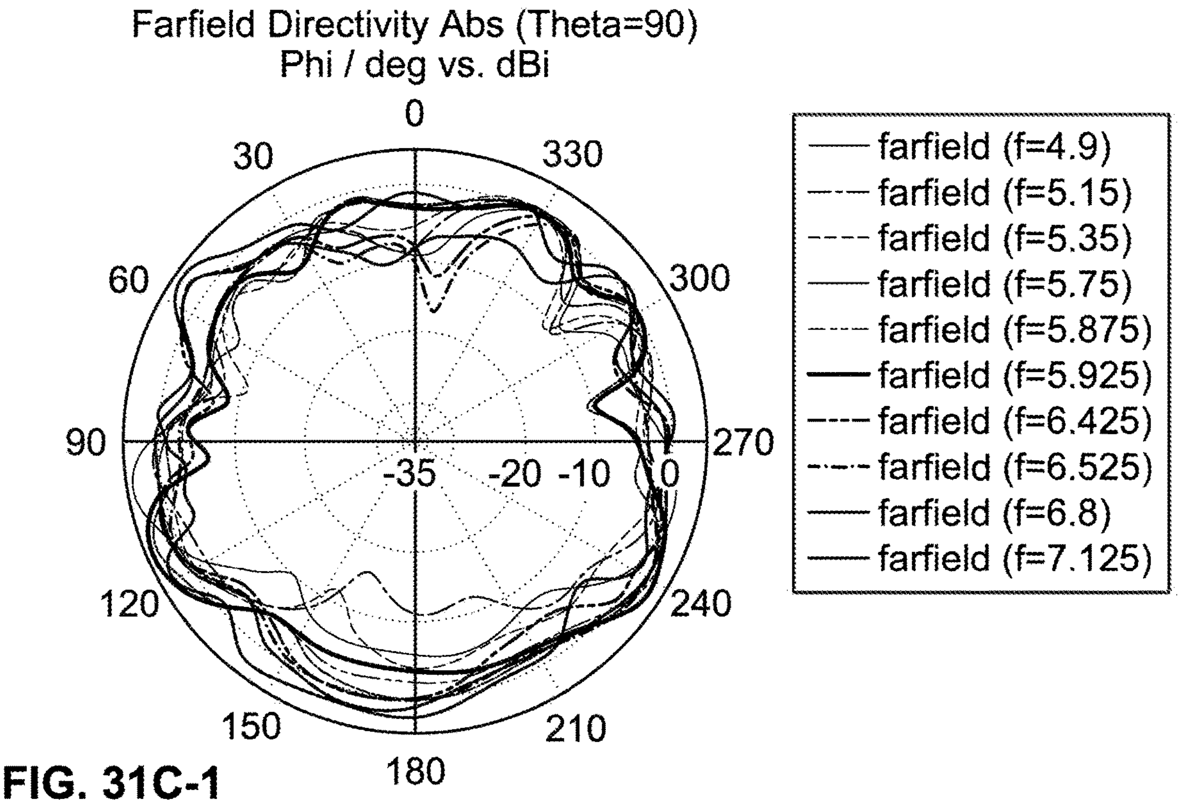
Figures 2, 31C:
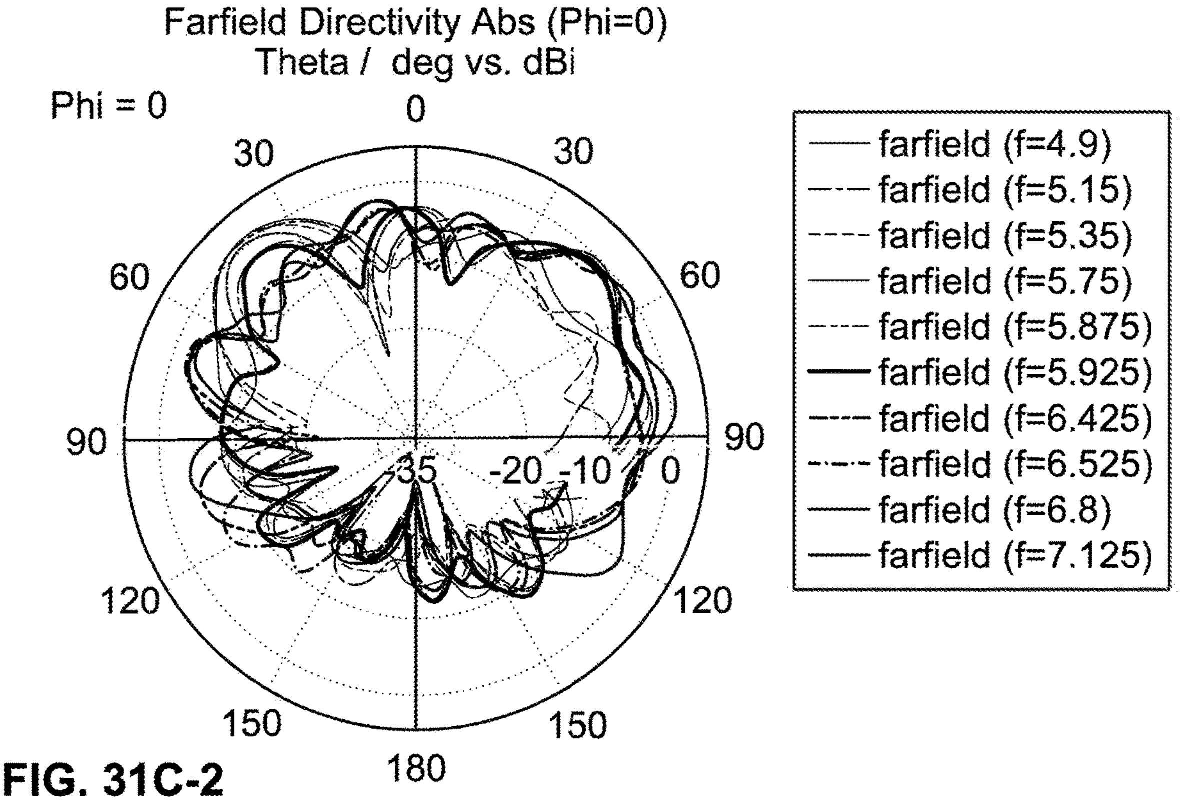
Figures 3, 31C:
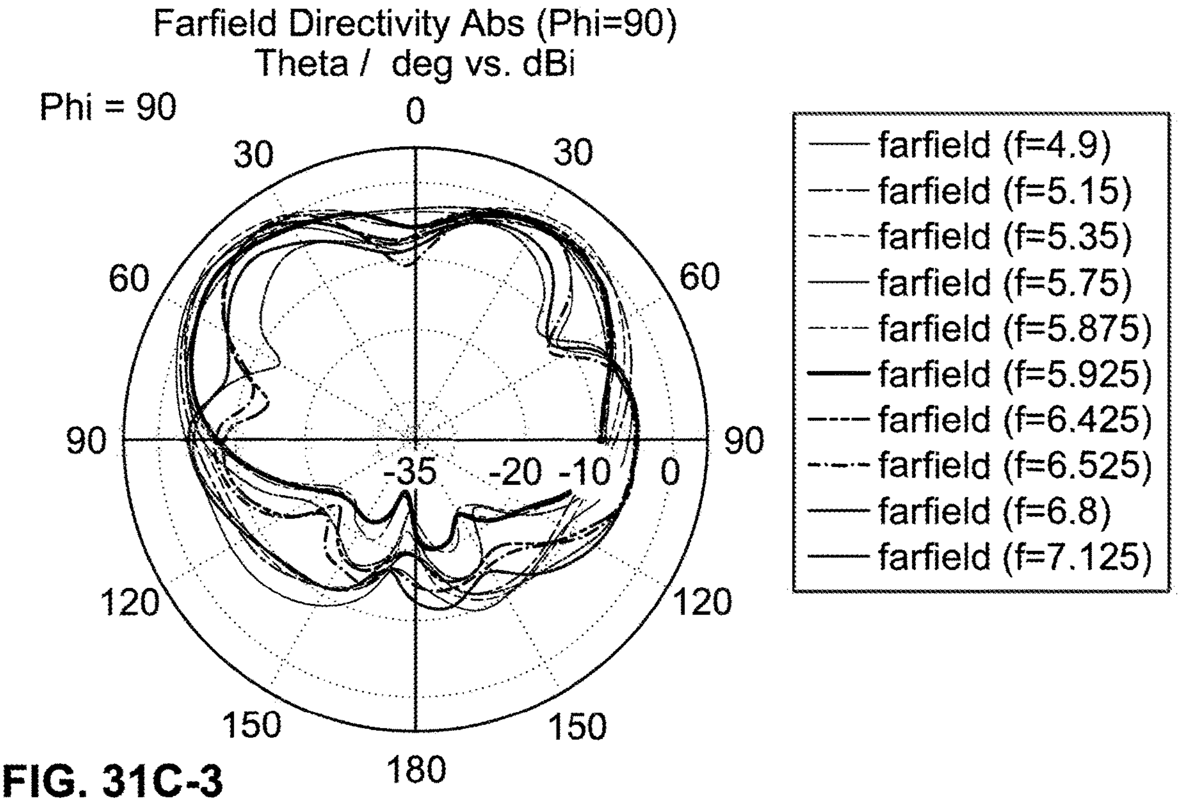

FIG. 26 is a perspective view of a portion of the antenna assembly 100 showing the first cellular antenna 200 in accordance with an exemplary embodiment. In the illustrated embodiment, the first cellular antenna 200 includes two integrated Wi-Fi PIFA antennas 224 having their feeding at perpendicular edges mirrored along the isolation slots 380 in the main body 372 and the portion 372 of the wrapped through the small segment 348. The slant slots 380 may be configured with the length and shape for good isolation between the integrated PIFA antenna.

FIGS. 27-30 and FIGS. 31A-1-31C-3 provide simulated results for an exemplary antenna assembly having the antenna arrangement as shown in FIG. 12. The antenna offers broadband functional bands, such as to satisfy cellular, Wi-FI, and Satellite coverage for a vehicle. The analysis results shown in FIGS. 27-30 and FIGS. 31A-1-31C-3 are provided for purposes of illustration and not for purposes of limitation. Alternative embodiments of the antenna assembly may be configured differently and have different operational or performance parameters than what is shown in FIGS. 27-30 and FIGS. 31A-1-31C-3.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

The invention claimed is:

1. An antenna assembly comprising:

an antenna base including a ground plane, the antenna base extending along a central longitudinal axis between a front and a rear of the antenna base, the antenna base having a first side and a second side extending between the front and the rear;

a first cellular antenna configured to be operable over one or more cellular frequencies, the first cellular antenna being mounted to the antenna base along the central longitudinal axis;

a second cellular antenna configured to be operable over one or more cellular frequencies, the second cellular antenna being mounted to the antenna base along the central longitudinal axis;

a satellite antenna configured to be operable over one or more satellite frequencies, the satellite antenna configured to be operable for receiving Global Navigation Satellite System (GNSS) signals, the satellite antenna being mounted to the antenna base along the central longitudinal axis;

a first Wi-Fi antenna configured to be operable over one or more Wi-Fi frequencies, the first Wi-Fi antenna being mounted to the antenna base offset from the central longitudinal axis toward the first side; and a second Wi-Fi antenna configured to be operable over one or more Wi-Fi frequencies, the second Wi-Fi antenna being mounted to the antenna base offset from the central longitudinal axis toward the second side.

2. The antenna assembly of claim 1, wherein the first and second Wi-Fi antennas are aligned with each other on opposite sides of the first cellular antenna.

3. The antenna assembly of claim 1, wherein the satellite antenna is located forward of the first and second cellular antennas proximate to the front of the antenna base.

4. The antenna assembly of claim 1, further comprising:

a third Wi-Fi antenna configured to be operable over one or more Wi-Fi frequencies, the third Wi-Fi antenna being mounted to the antenna base offset from the central longitudinal axis toward the first side; and a fourth Wi-Fi antenna configured to be operable over one or more Wi-Fi frequencies, the fourth Wi-Fi antenna being mounted to the antenna base offset from the central longitudinal axis toward the second side.

5. The antenna assembly of claim 1, wherein the first cellular antenna includes a first monopole including a first feed portion at a bottom of the first monopole and a first upper portion at a top of the first monopole, the first upper portion being bent in a non-planar configuration; and wherein the second cellular antenna includes a second monopole including a second feed portion at a bottom of the second monopole and a second upper portion at a top of the second monopole, the second upper portion being bent in a non-planar configuration.

6. The antenna assembly of claim 5, wherein the first monopole includes a first shorting leg extending from the first upper portion to the ground plane, and wherein the second monopole includes a second shorting leg extending from the second upper portion to the ground plane.

7. The antenna assembly of claim 5, wherein the first monopole includes a first integrated Wi-Fi antenna integrated with the first cellular antenna, the first integrated Wi-Fi antenna configured to be operable over one or more Wi-Fi frequencies, the first integrated Wi-Fi antenna being integrated into the first upper portion of the first monopole, and wherein the second monopole includes a second integrated Wi-Fi antenna integrated with the second cellular antenna, the second integrated Wi-Fi antenna configured to be operable over one or more Wi-Fi frequencies, the second integrated Wi-Fi antenna being integrated into the second upper portion of the second monopole.

8. The antenna assembly of claim 7, further comprising:

a first integrated Wi-Fi feed including a cable terminated to the first integrated Wi-Fi antenna at an elevated position remote from the antenna base; and a second integrated Wi-Fi feed including a cable terminated to the second integrated Wi-Fi antenna at an elevated position remote from the antenna base.

9. The antenna assembly of claim 8, wherein the cable of the first integrated Wi-Fi feed is routed along a first shorting leg extending between the first upper portion and the ground plane and wherein the cable of the second integrated Wi-Fi feed is routed along a second shorting leg extending between the second upper portion and the ground plane.

10. The antenna assembly of claim 7, wherein the first monopole includes a third integrated Wi-Fi antenna integrated with the first cellular antenna, the third integrated Wi-Fi antenna configured to be operable over one or more Wi-Fi frequencies, the third integrated Wi-Fi antenna being integrated into the first upper portion of the first monopole, the first upper portion including a slot between the first integrated Wi-Fi antenna and the third integrated Wi-Fi antenna, and wherein the second monopole includes a fourth integrated Wi-Fi antenna integrated with the second cellular antenna, the fourth integrated Wi-Fi antenna configured to be operable over one or more Wi-Fi frequencies, the fourth integrated Wi-Fi antenna being integrated into the second upper portion of the second monopole, the second upper portion including a slot between the second integrated Wi-Fi antenna and the fourth integrated Wi-Fi antenna.

11. The antenna assembly of claim 5, wherein the first upper portion includes a top edge and a side edge, the side edge being chamfered at a transverse angle relative to the top edge, and wherein the second upper portion includes a top edge and a side edge, the side edge being chamfered at a transverse angle relative to the top edge, wherein the chamfered side edge of the first upper portion is forward facing and wherein the chamfered side edge of the second upper portion is rearward facing.

12. The antenna assembly of claim 11, wherein the first and second cellular antennas are identical and oriented 180° relative to each other.

13. The antenna assembly of claim 5, wherein the first upper portion includes a slot forming a first integrated Wi-Fi antenna at the first upper portion, the slot in the first upper portion extends from one of a top edge or a side edge of the first upper portion, and wherein the second upper portion includes a slot forming a second integrated Wi-Fi antenna at the second upper portion, the slot in the second upper portion extends from one of a top edge or a side edge of the second upper portion.

14. The antenna assembly of claim 5, wherein the first upper portion includes a first PIFA antenna at the first upper portion, the first PIFA antenna configured to be operable over one or more Wi-Fi frequencies, and wherein the second upper portion includes a second PIFA antenna at the first upper portion, the second PIFA antenna configured to be operable over one or more Wi-Fi frequencies.

15. The antenna assembly of claim 5, wherein the first monopole antenna includes a first circuit board at the first feed portion and a first radiator extending from the first circuit board defining the first upper portion, the first circuit board being oriented vertically and extending from the antenna base, the first circuit board supporting the first radiator relative to the antenna base, the first circuit board including a circuit defining a vertical ground plane, a first feed cable being terminated to the vertical ground plane and connected to the first feed portion; and wherein the second monopole antenna includes a second circuit board at the second feed portion and a second radiator extending from the second circuit board defining the second upper portion, the second circuit board being oriented vertically and extending from the antenna base, the second circuit board supporting the second radiator relative to the antenna base, the second circuit board including a circuit defining a vertical ground plane, a second feed cable being terminated to the vertical ground plane and connected to the second feed portion.

16. The antenna assembly of claim 15, wherein the first radiator is stamped and formed from a metal plate including a connecting segment connected to the first circuit board, an extension segment extending from the connecting segment and bent out of plane from the connecting segment, a main body extending from the connecting segment and bent in a generally vertical orientation to a top edge of the first radiator, and a wrapped segment extending from one of the top edge or a side edge of the main body and being bent into a parallel and overlapping orientation to the main body, the main body and the wrapped segment forming the first upper portion; and wherein the second radiator is stamped and formed from a metal plate including a connecting segment connected to the second circuit board, an extension segment extending from the connecting segment and bent out of plane from the connecting segment, a main body extending from the connecting segment and bent in a generally vertical orientation to a top edge of the second radiator, and a wrapped segment extending from one of the top edge or a side edge of the main body and being bent into a parallel and overlapping orientation to the main body, the main body and the wrapped segment forming the second upper portion.

17. The antenna assembly of claim 5, wherein the first feed portion is stepped from a central feed point at a bottom of the first monopole antenna having multiple steps with slanted or curve edges, and wherein the second feed portion is stepped from a central feed point at a bottom of the second monopole antenna having multiple steps with slanted or curve edges.

18. The antenna assembly of claim 1, further comprising a whip antenna mounted to the antenna base proximate to the rear.

19. The antenna assembly of claim 1, further comprising a radome coupled to the antenna base such that an interior enclosure is collectively defined by the radome and the antenna base, the radome being a shark-fin shape being shorter at a front of the radome and taller at a rear of the radome, wherein the first cellular antenna, the second cellular antenna, the satellite antenna, the first Wi-Fi antenna, and the second Wi-Fi antenna being located in the internal enclosure.

20. The antenna assembly of claim 1, wherein the first Wi-Fi antenna includes a first Wi-Fi monopole element having a feed portion elevated from the ground plane, a first Wi-Fi feed cable being terminated to the feed portion, the first Wi-Fi antenna including a first shorting leg between the first Wi-Fi monopole element and the ground plane; and wherein the second Wi-Fi antenna includes a second Wi-Fi monopole element having a feed portion elevated from the ground plane, a second Wi-Fi feed cable being terminated to the feed portion, the second Wi-Fi antenna including a second shorting leg between the second Wi-Fi monopole element and the ground plane.

21. The antenna assembly of claim 20, wherein the first Wi-Fi monopole element is hollow and includes a plurality of slanted segments surrounding the hollow portion of the first Wi-Fi monopole element, and wherein the second Wi-Fi monopole element is hollow and includes a plurality of slanted segments surrounding the hollow portion of the second Wi-Fi monopole element.

22. An antenna assembly comprising:

an antenna base including a ground plane, the antenna base extending along a central longitudinal axis between a front and a rear of the antenna base, the antenna base having a first side and a second side extending between the front and the rear;

a first cellular antenna configured to be operable over one or more cellular frequencies, the first cellular antenna being mounted to the antenna base along the central longitudinal axis, the first cellular antenna including a first monopole including a first feed portion at a bottom of the first monopole and a first upper portion at a top of the first monopole, the upper portion being bent in a non-planar configuration;

a second cellular antenna configured to be operable over one or more cellular frequencies, the second cellular antenna being mounted to the antenna base along the central longitudinal axis, the second cellular antenna including a second monopole including a second feed portion at a bottom of the second monopole and a second upper portion at a top of the second monopole, the upper portion being bent in a non-planar configuration;

a satellite antenna configured to be operable over one or more satellite frequencies, the satellite antenna configured to be operable for receiving Global Navigation Satellite System (GNSS) signals, the satellite antenna being mounted to the antenna base along the central longitudinal axis;

a first integrated Wi-Fi antenna integrated with the first cellular antenna, the first integrated Wi-Fi antenna configured to be operable over one or more Wi-Fi frequencies, the first integrated Wi-Fi antenna being integrated into the first upper portion of the first monopole; and a second integrated Wi-Fi antenna integrated with the second cellular antenna, the second integrated Wi-Fi antenna configured to be operable over one or more Wi-Fi frequencies, the second integrated Wi-Fi antenna being integrated into the second upper portion of the second monopole.

23. An antenna assembly comprising:

an antenna base including a ground plane;

a first cellular antenna configured to be operable over one or more cellular frequencies, the first cellular antenna being mounted to the antenna base along the central longitudinal axis, the first cellular antenna including a first monopole including a first feed portion at a bottom of the first monopole connected to a first cellular feed extending through the base, the first monopole including a first upper portion at a top of the first monopole, the upper portion being bent in a non-planar configuration, the first monopole including a shorting leg extending between the first upper portion and the ground plane;

a second cellular antenna configured to be operable over one or more cellular frequencies, the second cellular antenna being mounted to the antenna base along the central longitudinal axis, the second cellular antenna including a second monopole including a second feed portion at a bottom of the second monopole connected to a second cellular feed extending through the base, the second monopole including a second upper portion at a top of the second monopole, the upper portion being bent in a non-planar configuration, the second monopole including a shorting leg extending between the second upper portion and the ground plane;

a satellite antenna configured to be operable over one or more satellite frequencies, the satellite antenna configured to be operable for receiving Global Navigation Satellite System (GNSS) signals, the satellite antenna being mounted to the antenna base along the central longitudinal axis;

a first Wi-Fi antenna configured to be operable over one or more Wi-Fi frequencies, the first Wi-Fi antenna being connected to a first Wi-Fi feed extending through the base; and a second Wi-Fi antenna configured to be operable over one or more Wi-Fi frequencies, the second Wi-Fi antenna being connected to a second Wi-Fi feed extending through the base.

* * * * *